(12) United States Patent
McCarthy et al.

(10) Patent No.: US 8,046,498 B2
(45) Date of Patent: Oct. 25, 2011

(54) DATA SYNCHRONIZATION PROTOCOL

(75) Inventors: Brendan A. McCarthy, San Francisco, CA (US); Carsten Guenther, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/779,754

(22) Filed: May 13, 2010

(65) Prior Publication Data

US 2010/0223400 A1    Sep. 2, 2010

Related U.S. Application Data

(63) Continuation of application No. 12/042,283, filed on Mar. 4, 2008, now Pat. No. 7,747,784.

(51) Int. Cl.
*G06F 15/16* (2006.01)

(52) U.S. Cl. ........ 709/248; 709/227; 709/228; 709/219; 709/223; 709/202; 715/700; 719/319; 370/503; 370/401

(58) Field of Classification Search .................. 709/203, 709/202, 227, 228, 219, 223
See application file for complete search history.

(56) References Cited

U.S. PATENT DOCUMENTS

| | | | |
|---|---|---|---|
| 5,684,984 A | 11/1997 | Jones et al. | |
| 5,706,509 A | 1/1998 | Man | |
| 5,728,335 A | 3/1998 | Neubauer | |
| 5,884,325 A | 3/1999 | Bauer et al. | |
| 5,987,376 A | 11/1999 | Olson et al. | |
| 6,173,335 B1 | 1/2001 | Culbert et al. | |
| 6,182,141 B1 | 1/2001 | Blum et al. | |
| 6,247,135 B1 | 6/2001 | Feague | |
| 6,253,228 B1 | 6/2001 | Ferris et al. | |
| 6,341,291 B1 | 1/2002 | Bentley et al. | |
| 6,430,576 B1 | 8/2002 | Gates et al. | |
| 6,823,456 B1 | 11/2004 | Dan et al. | |
| 6,829,655 B1 | 12/2004 | Huang et al. | |
| 6,910,052 B2 | 6/2005 | Gates et al. | |
| 6,970,876 B2 | 11/2005 | Hotti et al. | |
| 7,149,813 B2 | 12/2006 | Flanagin et al. | |
| 2002/0026474 A1 | 2/2002 | Wang et al. | |
| 2002/0029227 A1 | 3/2002 | Multer et al. | |

(Continued)

FOREIGN PATENT DOCUMENTS

EP    1014266 A2    6/2000

(Continued)

OTHER PUBLICATIONS

PCT Invitation to Pay Additional Fees in PCT/US2008/071812 dated Apr. 28, 2009.

(Continued)

*Primary Examiner* — Jude Jean Gilles
(74) *Attorney, Agent, or Firm* — Fish & Richardson P.C.

(57) ABSTRACT

Among other things, techniques and systems are disclosed for syncing data between a client device and a server. Synchronizing data includes initiating a sync session by negotiating a sync mode between a client device and a server for each of one or more dataclasses. A status code is generated based on a result of the negotiating. Based on the generated status code, the client device and the server exchanges one or more data items to be updated for the one or more dataclasses using the negotiated sync mode for each dataclass. The exchanged one or more data items are updated at the client device or the server The updated one or more data items are committed at the client or the server.

20 Claims, 48 Drawing Sheets

U.S. PATENT DOCUMENTS

| | | |
|---|---|---|
| 2004/0019614 A1 | 1/2004 | Wang |
| 2004/0103174 A1 | 5/2004 | Balducci et al. |
| 2004/0133591 A1 | 7/2004 | Holenstein et al. |
| 2005/0055382 A1 | 3/2005 | Ferrat et al. |
| 2005/0102328 A1 | 5/2005 | Ring et al. |
| 2005/0198084 A1 | 9/2005 | Kim |
| 2006/0075105 A1 | 4/2006 | Momtchilov et al. |
| 2006/0112150 A1 | 5/2006 | Brown et al. |
| 2006/0136511 A1 | 6/2006 | Ngo et al. |
| 2006/0136513 A1 | 6/2006 | Ngo et al. |
| 2006/0150079 A1 | 7/2006 | Albornoz et al. |
| 2006/0242210 A1 | 10/2006 | Ring et al. |
| 2006/0259524 A1 | 11/2006 | Horton |
| 2007/0100834 A1 | 5/2007 | Landry et al. |
| 2007/0162518 A1 | 7/2007 | Tian |
| 2007/0211873 A1* | 9/2007 | Wang .................. 379/142.01 |
| 2007/0226272 A1 | 9/2007 | Huang et al. |
| 2007/0255744 A1 | 11/2007 | Gideoni et al. |
| 2007/0260475 A1 | 11/2007 | Bhanote |
| 2008/0155112 A1 | 6/2008 | Ma et al. |
| 2008/0201362 A1* | 8/2008 | Multer et al. ............. 707/103 R |

FOREIGN PATENT DOCUMENTS

| | | |
|---|---|---|
| EP | 1291770 A2 | 3/2003 |
| GB | 2421606 A | 6/2006 |
| WO | WO2005116892 A1 | 12/2005 |
| WO | WO2006132534 A1 | 12/2006 |

OTHER PUBLICATIONS

European Search Report in Application No. 08161817.5 dated May 8, 2009.

Notification of Transmittal of the International Search Report and the Written Opinion of the International Searching Authority, or the Declaration in PCT/US2008/071812 dated Jul. 3, 2009.

Non-Final Office Action in U.S. Appl. No. 11/834,604 dated Nov. 27, 2009.

Apple Inc., Sync Services Programming Guide, Cocoa > Syncing [Online], XP-002532278, Oct. 31, 2007, © 2004, 2007 Apple Inc., Cupertino, pp. 1-372, URL: http://developer.apple.com/documentation/Cocoa/Conceptual/SyncServices/SyncServices.pdf.

PCT Notification of Transmittal of the International Search Report and the Written Opinion of the International Search Authority, or the Declaration in PCT/US2009/035909 dated Jul. 14, 2009.

Extended European Search Report in Application No. 09154256.3 dated Jul. 2, 2009.

Apple Inc., "Sync Services Framework Reference, Cocoa > Syncing," [Online] Oct. 31, 2007, XP002532279, © 2004, 2007 Apple Inc., URL:http://developer.apple.com/documentation/Cocoa/Reference/SyncServicesRef_ObjC/SyncServicesRef_ObjC.pdf, pp. 1-275.

Luca Prati et al., "XDMS-Network Address Book enabler," Hewlett-Packard OpenCall Software, pp. 1-4.

OMA Open Mobile Alliance, "SyncML Data Sync Protocol, Candidate Version 1.2—Jun. 1, 2004," Open Mobile Alliance, OMA-SyncML-DataSyncProtocol-V1_2-200400601-C, 2004 Open Mobile Alliance Ltd., XP-002375712, pp. 1-77.

PCT Notification of Transmittal of the International Search Report and Written Opinion of the International Search Authority, or the Declaration in PCT/US2009/035912 dated Jun. 5, 2009.

PCT Notification of Transmittal of the International Search Report and Written Opinion of the International Search Authority, or the Declaration in PCT/US2009/058414 dated Feb. 23, 2010.

Extended European Search Report in EP Patent Application No. 09171413.9 dated Feb. 18, 2010.

Extended European Search Report in EP Patent Application No. 08161817.5 dated Aug. 3, 2009.

European Examination Report in EP Patent Application No. 08161817.5 dated Mar. 4, 2010.

Non-Final Office Action in U.S. Appl. No. 12/042,305 dated Jun. 4, 2010.

Non-Final Office Action in U.S. Appl. No. 12/240,538 dated Jun. 18, 2010.

Extended European Search Report in EP Patent Application No. 09154249.8 dated Jun. 24, 2009.

Office Action in U.S. Appl. No. 12/607,921 mailed Oct. 1, 2010, 29 pages.

* cited by examiner

| Header Element | Type | Required | Description |
|---|---|---|---|
| service | String | √ | Name of the target service ("sync") |
| deviceid | String | √ | Id of the device requesting service |
| version | String | √ | Protocol cersion to use ("1.0") |
| userid | String | √ | Service user name |
| sequence | String | | Message sequence number |
| msisdn | String | | Device's phone number |
| final | Boolean | | TRUE if the session may terminate with this message |
| result | Dictionary | | Status dictionary for the previous message in the session |

FIG. 2

```
<?xml version="1.0" encoding="UTP-8"
<!DOCTYPE plist PUBLIC "-//Apple Computer//DTD PLIST 1.0//EN" "http://www.apple.com/DTDs/PropertyList-1.0.dtd">
<plist version="1.0">
<dict>
    <key>header</key>                                              ─┐
    <dict>                                                          │
312 ─┤  <key>deviceid</key>                                         │
        <string>f1234567a0745a890a86b5556d9e020202bRX8</string>     │
314 ─┤  <key>msisdn</key>                                           │ 310
        <string>14155338207</string>                                │
316 ─┤  <key>sequence</key>                                         │
        <string>1</string>                                          │
318 ─┤  <key>service</key>                                          │
        <string>sync</string>                                       │
319 ─┤  <key>version</key>                                          │
        <string>1.0</string>                                       ─┘
    </dict>
    <key>body</key>                                                ─┐
    <array>                                                         │ 320
      ⋮                                                             │
    </array>                                                       ─┘
</dict>
</plist>
```

FIG. 3

| Command Element | Type | Required | Description |
|---|---|---|---|
| name | String | √ | Name of command ("get") |
| sequence | String | √ | Message sequence number |
| params | Dictionary | | The command's parameters |
| more | Boolean | | TRUE if the command is split (will complete is a subsequent message) |

| Command Response Element | Type | Required | Description |
|---|---|---|---|
| name | String | √ | Name of command ("get") |
| sequence | String | √ | Message sequence number (matching parent command) |
| params | Dictionary | | The command response's parameters |
| more | Boolean | | TRUE if the command is split (will complete is a subsequent message) |
| result | Array | √ | Array of statuses |
| response | Boolean | √ | MUST be TRUE |

| Command Name | Parameter Name | Parameter Type | Req'd? | Description |
|---|---|---|---|---|
| get | | | | |
| | uri | String | √ | URI of object to retrieve |
| | userid | String | | Optionally override message's userid |
| | authtype | String | | Optional authentication type |
| | auth | String | | Optional authentication credential |

FIG. 6

| Command Response Name | Parameter Name | Parameter Type | Req'd? | Description |
|---|---|---|---|---|
| get | | | | |
| | uri | String | √ | URI of object which was retrieved |
| | value | String | √ | The return value |
| | itemtype | String | | The logical type of the value |

FIG. 7

| Command Name | Parameter Name | Parameter Type | Req'd? | Description |
|---|---|---|---|---|
| put | | | | |
| | uri | String | ✓ | URI of object to replace |
| | value | String | ✓ | Value to put |
| | itemtype | String | | The logical type of the value |
| | userid | String | | Optionally override message's userid |
| | authtype | String | | Optional authentication type |
| | auth | String | | Optional authentication credential |

FIG. 8

| Command Response Name | Parameter Name | Parameter Type | Req'd? | Description |
|---|---|---|---|---|
| put | | | | |
| | uri | String | ✓ | URI of object which was replaced |

FIG. 9

| Command Name | Parameter Name | Parameter Type | Req'd? | Description |
|---|---|---|---|---|
| delete | | | | |
| | uri | String | √ | URI of object to delete |
| | userid | String | | Optionally override message's userid |
| | authtype | String | | Optional authentication type |
| | auth | String | | Optional authentication credential |

FIG. 10

| Command Response Name | Parameter Name | Parameter Type | Req'd? | Description |
|---|---|---|---|---|
| delete | | | | |
| | uri | String | √ | URI of object which was deleted |

FIG. 11

| Command Name | Parameter Name | Parameter Type | Req'd? | Description |
|---|---|---|---|---|
| Sync-start | | | | Request a sync of dataclass with desired mode |
| | uri | String | ✓ | Dataclass name (e.g. "com.apple.Contacts") |
| | anchors | Dictionary | ✓ | Device, Server, filter, and reset anchors. Also requested sync mode & direction. The default sync mode is "fast" |

FIG. 12

| Command Response Name | Parameter Name | Parameter Type | Req'd? | Description |
|---|---|---|---|---|
| Sync-start | | | | Request a sync of dataclass with desired mode |
| | uri | String | ✓ | Dataclass name (e.g. "com.apple.Contacts") |
| | anchors | Dictionary | ✓ | Device, Server, filter, and reset anchors. Also requested sync mode & direction. The default sync mode is "fast" |

FIG. 13

| Command Name Sync-changes | Parameter Name | Parameter Type | Req'd? | Description |
|---|---|---|---|---|
| | | | | Send local changes or updates |
| | uri | String | √ | Dataclass for changes |
| | itemtype | String | √ | Type of item in this change command |
| | items | Dictionary | √ | Dictionary of items (format/type depends on "itemtype") Keys are device recordIds |
| | anchors | Dictionary | | Checkpoint anchors |
| | idmap | Dictionary | | Dictionary of UUID, LUID pairs. Keys are UUIDs; values are LUIDs |

FIG. 14

| Command Response Name Sync-changes | Parameter Name | Parameter Type | Req'd? | Description |
|---|---|---|---|---|
| | | | | Send local changes or updates |
| | uri | String | √ | Dataclass for changes |
| | anchors | Dictionary | | Checkpoint anchors |
| | idmap | Dictionary | | Dictionary of UUID, LUID pairs. Keys are UUIDs; values are LUIDs |

FIG. 15

| Command Name | Parameter Name | Parameter Type | Req'd? | Description |
|---|---|---|---|---|
| Sync-commit | | | | Dataclass to commit |
| | uri | String | √ | |
| | anchors | Dictionary | √ | Device sends "deviceAnchor" for server to store. "Server" anchor will be returned from server in the command's. Sync mode to use next syncAlso requested |

FIG. 16

| Command Response Name | Parameter Name | Parameter Type | Req'd? | Description |
|---|---|---|---|---|
| Sync-commit | | | | Dataclass which committed |
| | uri | String | √ | |

FIG. 17

| Command Name | Parameter Name | Parameter Type | Req'd? | Description |
|---|---|---|---|---|
| Sync-cancel | | | | |
| | uri | String | √ | Dataclass for which to cancel sync |
| | anchors | Dictionary | | Anchor vlaues to use next session |
| | status | Dictionary | | Optional status explaining reason for cancellation |

FIG. 18

| Command Response Name | Parameter Name | Parameter Type | Req'd? | Description |
|---|---|---|---|---|
| Sync-cancel | | | | |
| | uri | String | √ | Dataclass which canceled. |

FIG. 19

| Status Element | Type | Required | Description |
|---|---|---|---|
| code | String | √ | Numeric code (e.g. 607) for the status. |
| status | String | | Status string (e.g. E_BadValue) corresponding to the code |
| description | String | | Optional description of the problem |
| param-name | String | | Name of the command parameter associated with this Status (e.g. the param with a bad value). |
| param-index | String | | If the parameter indicated by "param-name" was an Array, this is the index of the item in the original command associated with the problem. |
| param-key | String | | If the parameter indicated by "param-name" was a Dictionary, this is the key of the item in the original command associated with the problem. |

FIG. 20

| Status | Code | Description | Parent Element |
|---|---|---|---|
| S_Ok | 600 | Success. | header, command |
| S_MultiStatus | 601 | Success with multi-valued statuses. | command |
| S_NotCompleted | 602 | Command processing was not completed. | command |
| E_NotFound | 603 | The indicated object or URI was not found. | command |
| E_NotAllowed | 604 | The operation is not permitted (insufficient access rights). | command |
| E_MissingParam | 605 | The command was missing a required parameters | command |
| E_ParamError | 606 | A supplied parameter was incorrect. | command |
| E_BadValue | 607 | A bad value was supplied | header, command |
| E_UnknownCommand | 608 | An unknown command was issued and ignored. | command |
| E_CommandNotProcessed | 609 | Command was not processed due to error processing previous a command. | command |
| E_StateError | 610 | A command was received which was unexpected given the command family's current state machine. | command |
| E_LimitExceeded | 611 | Too many items were supplied | command |
| E_VersionNotSupported | 612 | The protocol or command version is not supported. | header, command |
| E_NegotiationFailed | 613 | Sync mode negotiation failed | command |
| E_NotSupported | 614 | An unsupported (or unimplemented) operation was | header, command |
| E_Failed | 615 | Generic failure | header, command |
| E_Canceled | 616 | The current state machine has been cancelled. | command |
| E_ServiceBusy | 700 | The server is too busy and could not process the message. Retry later. | header |
| E_ServiceUnavailable | 701 | The server is unavailable and could not process the message. Retry later. | header |
| E_ServiceError | 702 | The server has an internal error. | header, command |
| E_BadRequest | 703 | The server could not understand the message | header |
| E_RetryLater | 704 | The server needs you to retry later. | header |

FIG. 21

Status Severity and Scope of Effect

This table indicates the effect of receiving a given status for a message or command:
- C   failure for that command only.
- F   termination of the command family state machine. (e.g. a "sync-cancel" command is forthcoming).
- M   message was not processed.
- S   session will terminate.

| Status | header | get | put | delete | sync-start | sync-changes | sync-cancel | sync-commit |
|---|---|---|---|---|---|---|---|---|
| S_Ok | | | | | | | | |
| S_MultiStatus | | | | | | | | |
| S_NotCompleted | | | | | | | | |
| E_NotFound | | C | C | C | F | F | F | F |
| E_NotAllowed | | C | C | C | F | F | F | F |
| E_MissingParam | M | C | C | C | F | F | F | F |
| E_ParamError | | C | C | C | F | F | F | F |
| E_BadValue | M | C | C | C | F | F | F | F |
| E_UnknownCommand | | C | C | C | F | F | F | F |
| E_CommandNotProcessed | | C | C | C | C | C | C | C |
| E_StateError | | C | C | C | F | F | F | F |
| E_LimitExceeded | M | C | C | C | F | F | F | F |
| E_VersionNotSupported | S | C | C | C | F | F | F | F |
| E_NegotiationFailed | | | | | C | | | |
| E_NotSupported | | C | C | C | F | F | F | F |
| E_Failed | S | C | C | C | F | F | F | F |
| E_Canceled | | | | | | | | |
| E_ServiceBusy | S | | | | | | | |
| E_ServiceUnavailable | S | | | | | | | |
| E_ServiceError | S | S | S | S | S | S | S | S |
| E_BadRequest | S | | | | | | | |
| E_RetryLater | S | | | | | | | |

FIG. 22

| Status Anchor Key | Type | Description |
|---|---|---|
| mode | String | Sync mode. If not present, "fast" is assumed. |
| direction | String | Sync direction. If not present, "twoway" is assumed. |
| device_version | String | Device agent version (used to infer device datastore behaviour.) |
| server_version | String | Server agent version (used to determine server datastore behaviour.) |
| last_device_anchor | String | Device's anchor from last sync session. |
| last_server_anchor | String | Server's anchor from last sync session. |
| next_device_anchor | String | Device's anchor to use for next sync version. |
| next_server_anchor | String | Server's anchor to use for next sync session. |

FIG. 23

| Anchor | SyncPhase | Server State |
|---|---|---|
| a0 | Negotiate | no change |
| a1 | pushing | device changes applied, server changes part 1 sent. |
| a2 | pushing | server changes impart 2. |
| A3 | commit complete | Synchronization complete |

| Key _{3210} | Value _{3220} | Description _{3232} |
|---|---|---|
| version | String | Product version (e.g. 1.14) |
| msisdn | String | Phone number of currently installed SIM card. |
| deviceId | String | Integrated circuit card identifier (ICCID) |
| Name | String | User's device name (e.g., iPhone, iPod, etc. |
| model | String | Device model (e.g. iPhone, iPod Touch) |
| carrier | String | Caries name (e.g., ATT) |
| dataclasses | Dictionary | Keys are supported database, value are Booleans indicating whether dataclass is enabled. |

FIG. 32

| Key _{3310} | Value _{3320} | Dataclass _{3330} | Description _{3340} |
|---|---|---|---|
| default_container | String | Contacts, Calendars | ID of container entity (e.g. Group id for contrast, Calendar few events). |
| Constrain_containers | Array | Contacts, Calendars | Set of IDs of container entities to include (e.g. set of Groups to include |
| Discarding_after_days | String | Calendar | Discard events older than idnication. |

FIG. 33

Table 3: Protocol psedo-ABNF

```
message = {
        "header"      = msg_header
        "body"        = *(cmd_request | cmd_response)
}
msg_header = {
        "deviceid"    = STRING
hostname.
        "userid" = STRING
        "service"     = STRING
        "version"     = STRING
        "sequence"    = *(DIGIT)
        ["final"]     = TRUE
        ["result"]    = cmd_status cmd_request = {
        "name" = cmd_name
        "sequence"    = *(DIGIT)
        "params"      = DICTIONARY
        ["version"]   = STRING
        ["more"]= TRUE cmd_response = {
        "name"        = cmd_name
        "sequence"    = *(DIGIT)
        ["result"]    = ARRAY of cmd_status
        ["params"]    = DICTIONARY
        "response"    =TRUE
} cmd_name     = "put" | "get" | "delete"|
               "sync-start" | "sync-changes" | "sync-commit" | "sync-cancel"

cmd_status = {
        "status"         = STRING
        "code"           = *(DIGIT)
        ["description"]  = STRING
        ["param-name"]   = STRING
        ["parm-index"]   =*(DIGIT)
        ["param-key"]    = STRING
}

;
; sync- specific definitions
;
"anchors" = {
        [version_type]   = STRING
        [anchor_type]    = STRING
        ["mode"]         = "slow" | "fast" | "reset"
        ["direction"]    = "to_device" | "to_server" | "twoway"
} item_type    = "record" | "change" | "filter" | "conflict"
version_type = "server_version" | "device_version"
anchor_type  = "last_server_anchor" | "next_server_anchor" |
               "last_device_anchor" | "next_device_anchor" | "filter_anchor" |
               "reset_anchor"
```

FIG. 34

Wiretrace Examples

Device requests a Reset sync for Contacts

See FIGS. 37a, 37b
- Message 1 (from Device)
  - sync-start (com.apple.Contacts, reset)
  - sync-changes (com.apple.Contacts, empty changes)

See FIGS. 38a, 38b, 38c, 38d
- Message 2 (from Server)
  - sync-start response (OK)
  - sync-changes response (OK)
  - sync-changes (sends a one Contact, Phone Number and Email Address)
  - get (deviceinfo)

See FIGS. 39a, 39b, 39c
- Message 3
  - sync-changes response (OK, id map)
  - get (OK, device info dictionary)
  - sync-commit (com.apple.Contacts)

See FIGS. 40a, 40b
- Message 4
  - sync-commit response (OK)

FIG. 36

```
POST /ota/ectomort HTTP/1.1
User-Agent: CFNetwork/152.4
Authorization: Basic PWNZn00b5ynCerz8ok4yG0WAY
Content-Length: 1526
Connection: keep-alive
Host: 10.6.18.58:2136

<?xml version="1.0" encoding="UTF-8"?>
<!DOCTYPE plist PUBLIC "-//Apple Computer//DTD PLIST 1.0//EN" "http://www.apple.com/
DTDs/PropertyList-1.0.dtd">
<plist version="1.0">
<dict>
 <key>header</key>
 <dict>
        <key>deviceid</key>
        <string>f1234567a0745a890a86b5556d9e020202bRX8</string>
        <key>msisdn</key>
        <string>14155338207</string>
        <key>sequence</key>
        <string>1</string>
        <key>service</key>
        <string>sync</string>
        <key>version</key>
        <string>1.0</string>
 </dict>
 <key>body</key>
 <array>
        <dict>
            <key>name</key>
            <string>sync-start</string>
            <key>sequence</key>
            <string>1</string>
            <key>params</key>
            <dict>
```

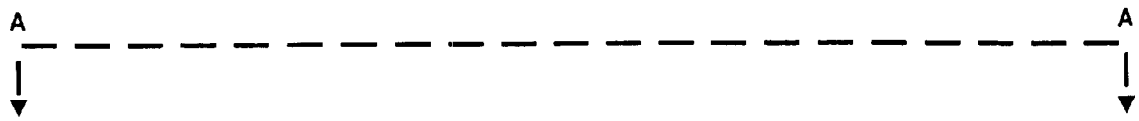

FIG. 37a

```
HTTP/1.1 200 OK
Server: AppleDotMacServer-NSP
x-responding-server: katallage
Set-Cookie: JSESSIONID=AB32321D4445D2813128633B7FA4BAB1; Path=/; Secure
Content-Type: text/xml
Content-Length: 4774
Date: Sat, 02 Feb 2008 04:49:06 GMT <?xml version="1.0" encoding="UTF-8"?>
<!DOCTYPE plist PUBLIC "-//Apple Computer//DTD PLIST 1.0//EN" "http://www.apple.com/
DTDs/PropertyList-1.0.dtd">
<plist version="1.0">
  <dict>
    <key>header</key>
      <dict>
        <key>version</key>
        <string>1.0</string>
        <key>deviceid</key>
        <string>sync.mac.com</string>
        <key>service</key>
        <string>sync</string>
        <key>sequence</key>
        <string>2</string>
      </dict>
    <key>body</key>
    <array>
        <dict>
          <key>response</key>
          <true/>
          <key>name</key>
          <string>sync-start</string>
          <key>sequence</key>
          <string>1</string>
          <key>result</key>
          <array>
              <dict>
                <key>status</key>
                <string>S_Ok</string>
                <key>code</key>
                <string>600</string>
              </dict>
          </array>
```

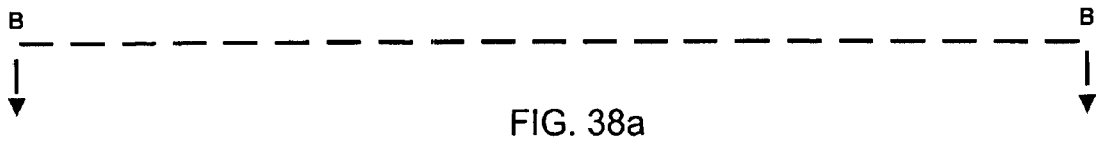

FIG. 38a

FIG. 38b

```
            <key>params</key>
              <dict>
                <key>uri</key>
                <string>com.apple.Contacts</string>
                <key>anchors</key>
                  <dict>
                    <key>mode</key>
                    <string>reset</string>
                    <key>server_version</key>
                    <string>104</string>
                  </dict>
              </dict>
        </dict>
        <dict>
          <key>response</key>
          <true/>
          <key>name</key>
          <string>sync-changes</string>
          <key>sequence</key>
          <string>2</string>
          <key>result</key>
          <array>
              <dict>
                <key>status</key>
                <string>S_Ok</string>
                <key>code</key>
                <string>600</string>
              </dict>
          </array>
          <key>params</key>
            <dict>
              <key>uri</key>
              <string>com.apple.Contacts</string>
            </dict>
        </dict>
        <dict>
          <key>name</key>
          <string>get</string>
          <key>sequence</key>
          <string>3</string>
          <key>params</key>
            <dict>
```

```
            <key>uri</key>
            <string>deviceinfo</string>
         </dict>
    </dict>
    <dict>
       <key>name</key>
       <string>sync-changes</string>
       <key>sequence</key>
       <string>4</string>
       <key>params</key>
          <dict>
             <key>items</key>
             <dict>
                <key>211CAE42-760A-417C-8EE0-ECD8206100CB</key>
                   <dict>
                      <key>com.apple.syncservices.RecordEntityName</key>
                      <string>com.apple.contacts.Contact</string>
                      <key>last name</key>
                      <string>Seargeant</string>
                      <key>job title</key>
                      <string>Guitarist</string>
                      <key>first name</key>
                      <string>Will</string>
                      <key>display as company</key>
                      <string>person</string>
                      <key>company name</key>
                      <string>Echo & the Bunnymen</string>
                   </dict>
                <key>7607BEEA-AD56-44CF-8332-46FD7142F4B4</key>
                   <dict>
                      <key>contact</key>
                      <array>
                         <string>211CAE42-760A-417C-8EE0-ECD8206100CB</string>
                      </array>
                      <key>value</key>
                      <string>will@glide.org</string>
                      <key>type</key>
                      <string>work</string>
                      <key>com.apple.syncservices.RecordEntityName</key>
```

FIG. 38c

```
POST /ota/ectomort HTTP/1.1
User-Agent: CFNetwork/152.4
Authorization: Basic PWNZn00b5ynCerz8ok4yG0WAY
Cookie: JSESSIONID=A832321D4445D281312863387FA4BAB1; Path=/; Secure
Content-Length: 2279
Connection: keep-alive
Host: 10.6.18.58:2136

<?xml version="1.0" encoding="UTF-8"?>
<!DOCTYPE plist PUBLIC "-//Apple Computer//DTD PLIST 1.0//EN" "http://www.apple.com/
DTDs/PropertyList-1.0.dtd">
<plist version="1.0">
<dict>
 <key>header</key>
 <dict>
        <key>deviceid</key>
        <string>f1234567a0745a890a86b5556d9e020202bRX8</string>
        <key>final</key>
        <string>TRUE</string>
        <key>msisdn</key>
        <string>14155338207</string>
        <key>sequence</key>
        <string>3</string>
        <key>service</key>
        <string>sync</string>
        <key>version</key>
        <string>1.0</string>
</dict>
<key>body</key>
<array>
        <dict>
                <key>name</key>
                <string>get</string>
                <key>sequence</key>
                <string>4</string>
                <key>response</key>
                <true/>
                <key>params</key>
                <dict>
                        <key>uri</key>
                        <string>deviceinfo</string>
                        <key>value</key>
```

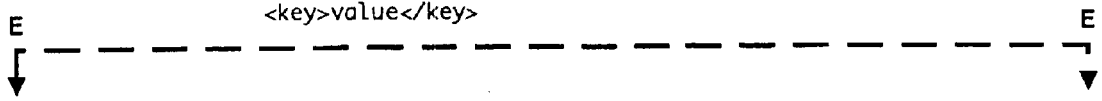

FIG. 39a

```
            <dict>
                    <key>deviceid</key>
                    <string>f1234567a0745a890a86b5556d9e020202bRX8</string>
                    <key>model</key>
                    <string>iPhone</string>
                    <key>msisdn</key>
                    <string>14155338207</string>
                    <key>name</key>
                    <string>EctoPhone</string>
                    <key>version</key>
                    <string>1.1.3</string>
            </dict>
    </dict>
    <key>result</key>
    <array>
            <dict>
                    <key>code</key>
                    <integer>600</integer>
                    <key>status</key>
                    <string>S_OK</string>
            </dict>
    </array>
</dict>
<dict>
    <key>name</key>
    <string>sync-changes</string>
    <key>sequence</key>
    <string>5</string>
    <key>response</key>
    <true/>
    <key>params</key>
    <dict>
            <key>idmap</key>
            <dict>
                    <key>211CAE42-760A-417C-8EE0-ECD8206100CB</key>
                    <string>349</string>
                    <key>520F8EDE-0050-427D-BD60-B268A79ED346</key>
                    <string>3/349/0</string>
```

FIG. 39b

```
HTTP/1.1 200 OK
Server: AppleDotMacServer-NSP
x-responding-server: katallage
Content-Type: text/xml
Content-Length: 1807
Date: Sat, 02 Feb 2008 04:49:06 GMT <?xml version="1.0" encoding="UTF-8"?>
<!DOCTYPE plist PUBLIC "-//Apple Computer//DTD PLIST 1.0//EN" "http://www.apple.com/
DTDs/PropertyList-1.0.dtd">
<plist version="1.0">
  <dict>
    <key>header</key>
    <dict>
      <key>sequence</key>
      <string>4</string>
      <key>deviceid</key>
      <string>sync.mac.com</string>
      <key>service</key>
      <string>sync</string>
      <key>final</key>
      <true/>
      <key>version</key>
      <string>1.0</string>
    </dict>
    <key>body</key>
    <array>
        <dict>
          <key>response</key>
          <true/>
          <key>name</key>
          <string>sync-commit</string>
          <key>sequence</key>
          <string>5</string>
          <key>result</key>
          <array>
            <dict>
              <key>status</key>
              <string>S_Ok</string>
              <key>code</key>
              <string>600</string>
            </dict>
          </array>
```

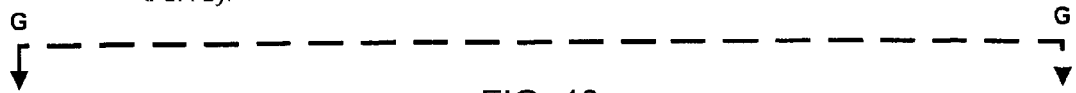

FIG. 40a

```
    <key>params</key>
      <dict>
        <key>uri</key>
        <string>com.apple.Contacts</string>
        <key>anchors</key>
          <dict>
            <key>server_anchor</key>
            <string>February 1, 2008 20:49:02 PST</string>
            <key>mode</key>
            <string>fast</string>
            <key>device_anchor</key>
            <string>February 1, 2008 20:49:02 PST</string>
            <key>device_version</key>
            <string>105</string>
          </dict>
      </dict>
    </dict>
  </array>
 </dict>
</plist>
```

FIG. 40b

Fast Sync, device and server each have a single delete.

- Message 1 (from Device)
  - sync-start (com.apple.Contacts, fast)
  - sync-changes (com.apple.Contacts, delete a record)
- Message 2 (from Server)
  - sync-start response (OK)
  - sync-changes response (OK)
  - sync-changes (com.apple.Contacts, delete another record)
  - sync-commit (com.apple.Contacts, anchor)

See FIGS. 42a, 42b

See FIGS. 43a, 43b, 43c

FIG. 41

```
POST /ota/ectomort HTTP/1.1
User-Agent: CFNetwork/152.4
Authorization: Basic PWNZn00b5ynCerz8ok4yG0WAY
Content-Length: 2411
Connection: keep-alive
Host: 10.6.18.58:2136

<?xml version="1.0" encoding="UTF-8"?>
<!DOCTYPE plist PUBLIC "-//Apple Computer//DTD PLIST 1.0//EN" "http://www.apple.com/
DTDs/PropertyList-1.0.dtd">
<plist version="1.0">
<dict>
 <key>header</key>
 <dict>
        <key>deviceid</key>
        <string>f1234567a0745a890a86b5556d9e020202bRX8</string>
        <key>msisdn</key>
        <string>14155338207</string>
        <key>sequence</key>
        <string>1</string>
        <key>service</key>
        <string>sync</string>
        <key>version</key>
        <string>1.0</string>
 </dict>
<key>body</key>
<array>
        <dict>
               <key>name</key>
               <string>sync-start</string>
               <key>sequence</key>
               <string>1</string>
               <key>params</key>
               <dict>
                      <key>anchors</key>
                      <dict>
                             <key>device_version</key>
                             <integer>105</integer>
                             <key>last_device_anchor</key>
                             <string>February 1, 2008 20:49:02 PST</string>
                             <key>mode</key>
                             <string>fast</string>
                             <key>next_device_anchor</key>
```

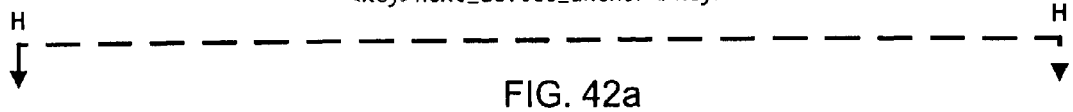

FIG. 42a

```
HTTP/1.1 200 OK
Server: AppleDotMacServer-NSP
x-responding-server: katallage
Set-Cookie: JSESSIONID=5ADE852CE33827B6C890EBB5954F55C9; Path=/; Secure
Content-Type: text/xml
Content-Length: 3349
Date: Sat, 02 Feb 2008 04:49:54 GMT <?xml version="1.0" encoding="UTF-8"?>
<!DOCTYPE plist PUBLIC "-//Apple Computer//DTD PLIST 1.0//EN" "http://www.apple.com/
DTDs/PropertyList-1.0.dtd">
<plist version="1.0">
  <dict>
    <key>header</key>
      <dict>
        <key>version</key>
        <string>1.0</string>
        <key>deviceid</key>
        <string>sync.mac.com</string>
        <key>service</key>
        <string>sync</string>
        <key>sequence</key>
        <string>2</string>
      </dict>
    <key>body</key>
    <array>
        <dict>
          <key>response</key>
          <true/>
          <key>sequence</key>
          <string>1</string>
          <key>name</key>
          <string>sync-start</string>
          <key>result</key>
          <array>
              <dict>
                <key>status</key>
                <string>S_Ok</string>
                <key>code</key>
                <string>600</string>
              </dict>
          </array>
```

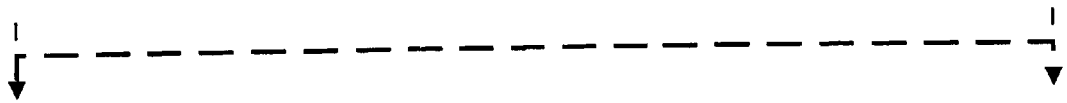

FIG. 43a

DATA SYNCHRONIZATION PROTOCOL

This application is a continuation (and claims the benefit of priority under 35 USC 120) of U.S. application Ser. No. 12/042,283, filed Mar. 4, 2008 now U.S. Pat. No. 7,747,784. The disclosure of the prior application is considered part of (and is incorporated by reference in) the disclosure of this application.

TECHNICAL FIELD

This application relates to protocols for data synchronization.

BACKGROUND

Data synchronizing between a client and a server can be performed using synchronization protocols such as Open Mobile Alliance—Data Synchronization protocol OMA DS/SyncML (formerly known as the SyncML protocol). The OMS DA/SyncML is a sync protocol that enables serial synchronization of dataclasses and can require 5 or more roundtrips per dataclass.

SUMMARY

Among other things, techniques and systems are disclosed for syncing data between a client device and a server.

In one aspect, synchronizing data includes receiving a request to initiate a sync session. The request includes a proposed sync mode for each of one or more dataclasses, and one or more changes to the one or more dataclasses. One or more status codes are generated to indicate whether the proposed sync mode for each dataclass is accepted. Based on the generated status code, the accepted sync mode is used for each dataclass to selectively update one or more data items associated with the one or more changes to the one or more dataclasses. The updated one or more data items are selectively committed at the server.

Implementations can optionally include one or more of the following features. Generating one or more status codes can include accessing information saved from a previous sync session to determine whether to use the proposed sync mode to synchronize the one or more data items. Receiving the request can include receiving the proposed sync mode for two or more dataclasses in parallel. Also, receiving the request can include receiving the proposed sync mode that includes a fast sync mode, a slow sync mode or a reset sync mode. Further, receiving the request can include receiving a fast sync mode that enables exchange of data items to be updated only. The sync session can be completed in one round trip that includes two messages. When the sync session is interrupted, a fast sync can be reaccepted. The proposed sync mode and the one or more changes to the one or more dataclasses can be received in a single message from a client device. The updated one or more data items can be selectively committed at the server when the client device sends a command to commit the updated one or more data items. In addition, the proposed sync mode can be rejected and the received request can be responded to with a different sync mode.

In another aspect, a computer program product, embodied on a computer readable medium, is operable to cause a data processing apparatus to perform various operations. The computer program product is operable to cause a data processing apparatus to receive a request to initiate a sync session. The request includes a proposed sync mode for each of one or more dataclasses and one or more changes to the one or more dataclasses. The computer program product is operable to cause a data processing apparatus to generate a status code indicative of whether the proposed sync mode for each dataclass is accepted. The computer program product is operable to cause a data processing apparatus to based on the generated status code, use the accepted sync mode for each dataclass is used to selectively update one or more data items associated with the one or more changes to the one or more dataclasses. In addition, the computer program product is configured to cause a data processing apparatus to selectively commit the updated one or more data items at a server.

Implementations can optionally include one or more of the following features. The computer program product can cause a data processing apparatus to generate the one or more status codes based on information saved from a previous sync session. The computer program product can cause a data processing apparatus to receive the proposed sync mode for two or more dataclasses in parallel. The computer program product can cause a data processing apparatus to receive the proposed sync mode that includes a fast sync mode, a slow sync mode or a reset sync mode. The computer program product can cause a data processing apparatus to receive a fast sync mode that enables exchange of data items to be updated only. Update operations on a data item may (1) create a new item (add), (2) modify properties of an existing item (modify) or (3) delete an existing item (delete). The computer program product can cause a data processing apparatus to complete the sync session in one round trip that includes two messages. The computer program product can cause a data processing apparatus to reaccept a fast sync mode when the sync session is interrupted. The computer program product can cause a data processing apparatus to receive the proposed sync mode and the one or more changes to the one or more dataclasses in a single message. The computer program product can cause a data processing apparatus to selectively commit the updated one or more data items at the server when the client device sends a command to commit the updated one or more data items. In addition, the computer program product can case a data processing apparatus to reject the proposed sync mode and respond to the received request with a different sync mode.

In another aspect, a server for syncing data includes a processor configured to operate a transport protocol that enables opening of one or more connections to one or more client devices. The processor is also configured to operate a sync protocol that enables data synchronization between the server and the one or more client devices over the opened one or more connections. The sync protocol enables the server to receive a request to initiate a sync session. The request includes a proposed sync mode fore each of one or more dataclasses and one or more changes to the one or more dataclasses. The sync server also enables the server to generate one or more status codes to indicate whether the proposed sync mode for each dataclass is accepted. The sync protocol also enables the server to, based on the generated status code, use the accepted sync mode for each dataclass to selectively update one or more data items associated with the one or more changes to the one or more dataclasses. The sync protocol further enables the updated one or more data items to be selectively committed at the server.

Implementations can optionally include one or more of the following features. The processor can be configured to access a data repository to update one or more data items based on the received one or more changes. The processor can be configured to operate the sync protocol to accept or reject the proposed sync mode for each dataclass based on information saved from a previous sync session. The processor can be configured to operate the sync protocol to received the proposed sync mode for two or more dataclasses in parallel. Also, the processor can be configured to operate the sync protocol to receive the proposed sync mode that includes a fast sync mode, a slow sync mode or a reset sync mode. The processor can be configured to operate the sync protocol to receive the proposed sync mode that includes a fast sync mode that enables the one or more client devices to send data items to be updated only. The processor can be configured to operate the sync protocol to receive request to reinitiate a fast sync when the sync session is interrupted. The processor can be configured to operate the sync protocol to complete the sync session in one round trip that includes two messages. The processor can be configured to operate the sync protocol to receive the proposed sync mode and the one or more changes to the one or more dataclasses in a single message from at least one of the one or more client devices. The processor can be configured to operate the sync protocol to selectively commit the updated one or more data items at the server when one of the one or more client devices sends a command to commit the updated one or more data items. Further, the processor can be configured to operate the sync protocol to rejecting the proposed sync mode and responding to the request with a different sync mode.

In another aspect, synchronizing data includes sending a request to a server to initiate a sync session. The request includes a proposed sync mode for each of one or more dataclasses, and one or more changes to the one or more dataclasses. One or more status codes are received to indicate whether the proposed sync mode for each dataclass has been accepted by the server. Based on the received status code, the accepted sync mode for each dataclass is used to receive from the server additional changes to the one or more dataclasses. Further, at a client device, the additional changes received from the server are committed.

Implementations can optionally include one or more of the following features. The one or more status codes can indicate that the proposed sync mode for at least one of the one or more data classes has been rejected by the server. Another request that includes a different sync mode than the rejected sync mode can be sent to the server. Also, the proposed sync mode and the one or more changes can be sent in a single message to the server. The proposed sync mode for two or more dataclasses can be sent in parallel. In addition, a different proposed sync mode can be sent for each of the two or more dataclasses in parallel. For example, a proposed fast sync mode can be sent for one of the dataclasses and a proposed slow sync mode for another of the dataclasses. After the sync session is interrupted, the sync session can be reinitiated using the accepted sync protocol.

In another aspect, a computer program product, embodied on a computer-readable medium, is operable to cause a data processing apparatus to perform one or more operations. The computer program product is operable to cause a data processing apparatus to send a request to a server to initiate a sync session. The request includes a proposed sync mode for each of one or more dataclasses and one or more changes to the one or more dataclasses. The computer program product is operable to cause a data processing apparatus to receive one or more status codes that are indicative of whether the proposed sync mode for each dataclass has been accepted by the server. Based on the received status code, the computer program product is operable to use the accepted sync mode to receive from the server additional changes to the one or more dataclasses and commit at a client device the additional changes received from the server.

Implementations can optionally include one or more of the following features. The computer program product can be operable to cause a data processing apparatus to perform operations that includes receiving the one or more status codes that indicate that the proposed sync mode for at least one of the one or more data classes has been rejected by the server; and sending another request that includes a different sync mode than the rejected sync mode. The computer program product can be operable to cause a data processing apparatus to send the proposed sync mode and the one or more changes in a single message to the server. The computer program product can be operable to cause the data processing apparatus to send the proposed sync mode for two or more dataclasses in parallel. The computer program product can be operable to cause the data processing apparatus to send a different proposed sync mode for each of the two or more dataclasses in parallel. The computer program product can be operable to cause the data processing apparatus to send a proposed fast sync mode for one of the dataclasses and a proposed slow sync mode for another of the dataclasses. The computer program product can be operable to cause the data processing apparatus to reinitiate the sync session using the accepted sync protocol after the sync session is interrupted.

In another aspect, a client device includes a processor configured to operate a transport protocol that enables opening of one or more connections to a server and a sync protocol that enables data synchronization between the client device and the server over the opened one or more connections. The sync protocol enables the client device to send a request to a server to initiate a sync session. The request includes a proposed sync mode for each of one or more dataclasses and one or more changes to the one or more dataclasses. The sync protocol also enables the client device to receive one or more status codes indicative of whether the proposed sync mode for each dataclass has been accepted by the server. Based on the received status code, the sync protocol enables the client device to use the accepted sync mode to receive from the server additional changes to the one or more dataclasses. Further, the sync protocol enables the client device to commit at a client device the additional changes received from the server.

Implementations can optionally include one or more of the following features. The processor can be configured to operate the sync protocol to receive the one or more status codes that indicate that the proposed sync mode for at least one of the one or more data classes has been rejected by the server; and send another request that includes a different sync mode than the rejected sync mode. The processor can be configured to operate the sync protocol to send the proposed sync mode and the one or more changes in a single message to the server. The processor can be configured to operate the sync protocol to send the proposed sync mode for two or more dataclasses in parallel. The processor can be configured to operate the sync protocol to send the proposed sync mode for two or more dataclasses in parallel comprising sending a different proposed sync mode for each of the two or more dataclasses in parallel. The processor can be configured to operate the sync protocol to send a proposed fast sync mode for one of the dataclasses and a proposed slow sync mode for another of the dataclasses. The processor can be configured to operate the sync protocol to reinitiate the sync session using the accepted sync protocol after the sync session is interrupted.

Techniques and systems according to the present specification can be implemented to potentially provide various advantages. The sync protocol as described in this specification can reduce the number of round trips (the number of back and forth messages exchanged) to complete a sync session.

The sync protocol as described in this specification can complete a sync session in one round trip, for example. The sync protocol as described in this specification enables sync mode negotiation for each of multiple dataclasses in parallel. Thus, a request for sync mode negotiation can be sent for multiple dataclasses in one message. Further, the sync protocol as described in this specification enables field level differencing and record level differencing.

The synchronization protocol as described in this specification is simpler than conventional protocols, such as SyncML. The set of commands available for the synchronization protocol is simple and yet extensible. Unlike SyncML, the synchronization protocol as described in this specification represents each message as a text or binary property list files (plist). In addition, the synchronization protocol as described in this specification is efficient and robust. For example, a sophisticated anchor logic is provided on the server. Further, the synchronization protocol is tolerant of unreliable network. Even when the network connection is interrupted, the anchor logic ensures efficient synchronization once reconnected. Further, the synchronization protocol can maintain relatively small message size.

The synchronization protocol as described in this specification is rich. For example, the synchronization protocol enables exchange of device information between the client device and the server. Also, the synchronization protocol provides convenient yet rich data representation.

BRIEF DESCRIPTION OF THE DRAWINGS

FIG. 2 is a table showing example elements for the header element of a message.

FIG. 3 shows an example property list file (plist).

FIG. 4 is a table showing example elements for a command request element.

FIG. 5 is a table shows example elements for command response element.

FIG. 6 is a table showing example parameters for a get command.

FIG. 7 is a table that shows examples of parameters for a get command response.

FIG. 8 is a table showing example parameters for a put command.

FIG. 9 is a table showing example parameters for a put command response.

FIG. 10 is a table showing example parameters for a delete command.

FIG. 11 is a table showing example parameters for a delete command response.

FIG. 12 is a table showing example parameters for a sync-start command.

FIG. 13 is a table that shows example parameters for a sync-start command response.

FIG. 14 is a table showing example parameters for a sync-changes command.

FIG. 15 is a table showing example parameters for a sync-changes command response.

FIG. 16 is a table showing example parameters for a sync-commit command.

FIG. 17 is a table showing example parameters for a sync-commit command response.

FIG. 18 is a table showing example parameters for a sync-cancel command.

FIG. 19 is a table showing example parameters for a sync-cancel command response.

FIG. 20 is a table showing example status elements.

FIG. 21 is a table showing example status codes for statuses available to be included in message headers, commands and command responses.

FIG. 22 is a table describing the effect of receiving a given status for a command on the session or on other commands in the message.

FIG. 23 is a table showing example keys for the anchors element.

FIG. 31 is a table showing example checkpoint anchors.

FIG. 32 shows a table defines example key-value pairs for the DeviceInfo element.

FIG. 33 is a table showing example key-value pairs for filter settings.

FIG. 34 is an augmented Backus-Naur Form (ABNF) description of the protocol syntax.

FIG. 36 shows a summary of four example messages for a reset sync session.

FIGS. 37a and 37b show an example message sent from a client device to a server.

FIGS. 38a, 38b, 38c and 38d show an example message sent from a server to a client device.

FIGS. 39a, 39b and 39c show an example message sent from a client device.

FIGS. 40a and 40b shown an example message sent from a server.

FIG. 41 shows a summary of two example messages for a fast sync.

FIGS. 42a and 42b show an example message sent from a client device for a fast sync.

FIGS. 43a, 43b and 43c show an example message sent from a server in response to a message sent by a client device.

Like reference symbols and designations in the various drawings indicate like elements.

DETAILED DESCRIPTION

Figure 1A:
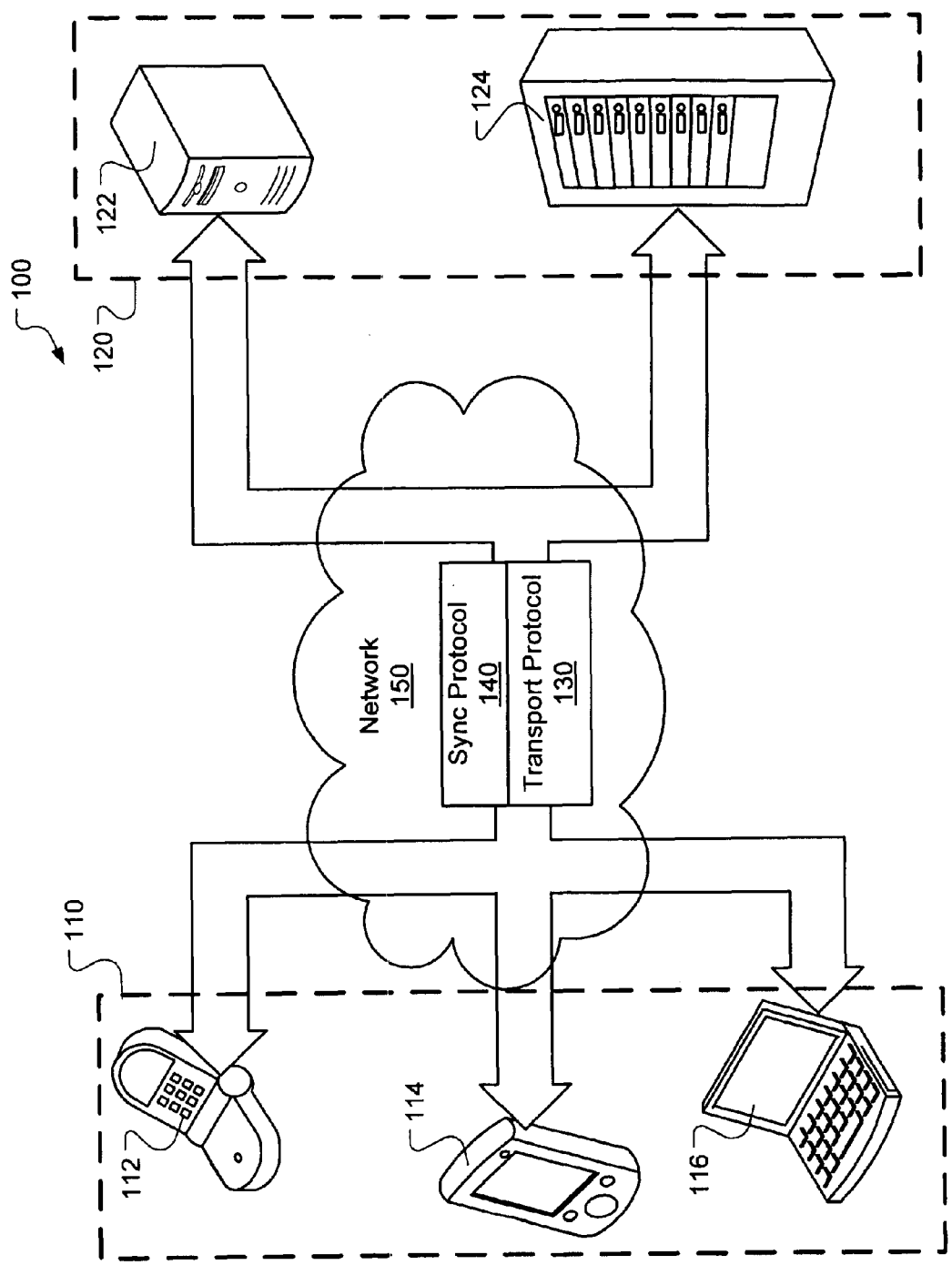
FIG. 1A is a block diagram showing a system for enabling data synchronization between a client device and a server.

Techniques and systems are disclosed for enabling over-the-air (OTA) synchronization between a client device and a server. In particular, a wireless structured data synchronization protocol can enable a client device to interface with a server to synchronize various data. Such protocol can be used to synchronize Mac® Operating System X (OS X) SyncServices data between a handheld device such as the iPhone® and a server such as the .Mac® server, for example.

The OTA synchronization protocol as described in this specification relies upon the underlying network transport to perform authentication and/or authorization and message security/encryption using transport layer security (TLS), for example. The synchronization protocol can enable these data transport using hypertext transfer protocol (HTTP) transport protocol or other similar transport protocols which are capable of exchanging synchronization protocol messages between the device and server.

The synchronization protocol can enable exchange of protocol messages over the transport, such as HTTP transport. The each message exchanged over the transport includes a header element and a body element. The body element can include a sequence of command and/or command response elements. The synchronization protocol assigns a unique label to each message, command and command response to ensure proper ordering and loss detection. For example, the label can include a sequence of numbers for ordering the messages, commands and command responses. Using the label, the synchronization protocol, instead of the transport (e.g., HTTP) ensures proper ordering and loss detection even when the network protocol does not enforce message ordering.

The synchronization protocol is simpler than conventional protocols, such as Synchronization Markup Language (SyncML). The set of commands available for the synchronization protocol is simple and yet extensible. For example, three flexible primitive commands are available for manipulating resources. In addition, four "sync" family commands are available for data synchronization. Further, commands may be split across message boundaries. Unlike SyncML, the synchronization protocol as described in this specification represents each message as a text or binary property list files (plist). In the Mac OS X Cocoa, NeXTSTEP, and GNUstep programming frameworks, plists are files that store serialized objects. The plists are often used to store a user's settings, similar to the function of the Windows registry on Microsoft Windows®. Property list files are also used to store information about bundles and applications. A plist is easy to generate and parse using standard operating system (OS) features, such as NSPropertyListSerialization class. Also, the synchronization protocol as described in this specification uses simple sync state machine.

The synchronization protocol as described in this specification is efficient and robust. For example, a sophisticated anchor logic is provided on the server. An anchor is a tag or label used to keep track of the synchronization state. Also, the synchronization protocol can sync multiple dataclasses in parallel. The synchronization protocol is tolerant of unreliable network. Even when the network connection is interrupted, the anchor logic ensures efficient synchronization once reconnected with minimal retransmission of data. Further, the synchronization protocol can maintain relatively small message size.

The synchronization protocol as described in this specification is rich. For example, the synchronization protocol enables exchange of device information between the client device and the server. Also, the synchronization protocol provides convenient yet rich data representation.

FIG. 1a is a block diagram of a system 100 for enabling data synchronization between a client device and a server. The system 100 includes one or more client devices 110 interfacing with one or more servers 120 over a network 150. The client device 110 can include mobile devices, such as a mobile phone 112, a personal digital assistant (PDA) 114, a handheld data processing devices 116, etc. The mobile phone 112 includes smart phones and integrated mobile devices such as the iPhone®. The handheld data processing devices can include audio playback devices such as MP3 players and iPod® devices.

The client device 110 interfaces with the server 120 using a transport protocol such as HTTP transport protocol to complete a secure data connection. Through the transport protocol, a synchronization protocol 140 enables data synchronization between the connected client device 110 and the server. Synchronized data can include various data classes such as contacts (e.g., addresses and phone numbers), calendar, etc. Data synchronization can be performed over the network 150 that includes various wired and wireless networks such as local area network (LAN), wide area network (WAN), Ethernet, Internet, etc.

Figure 1B:
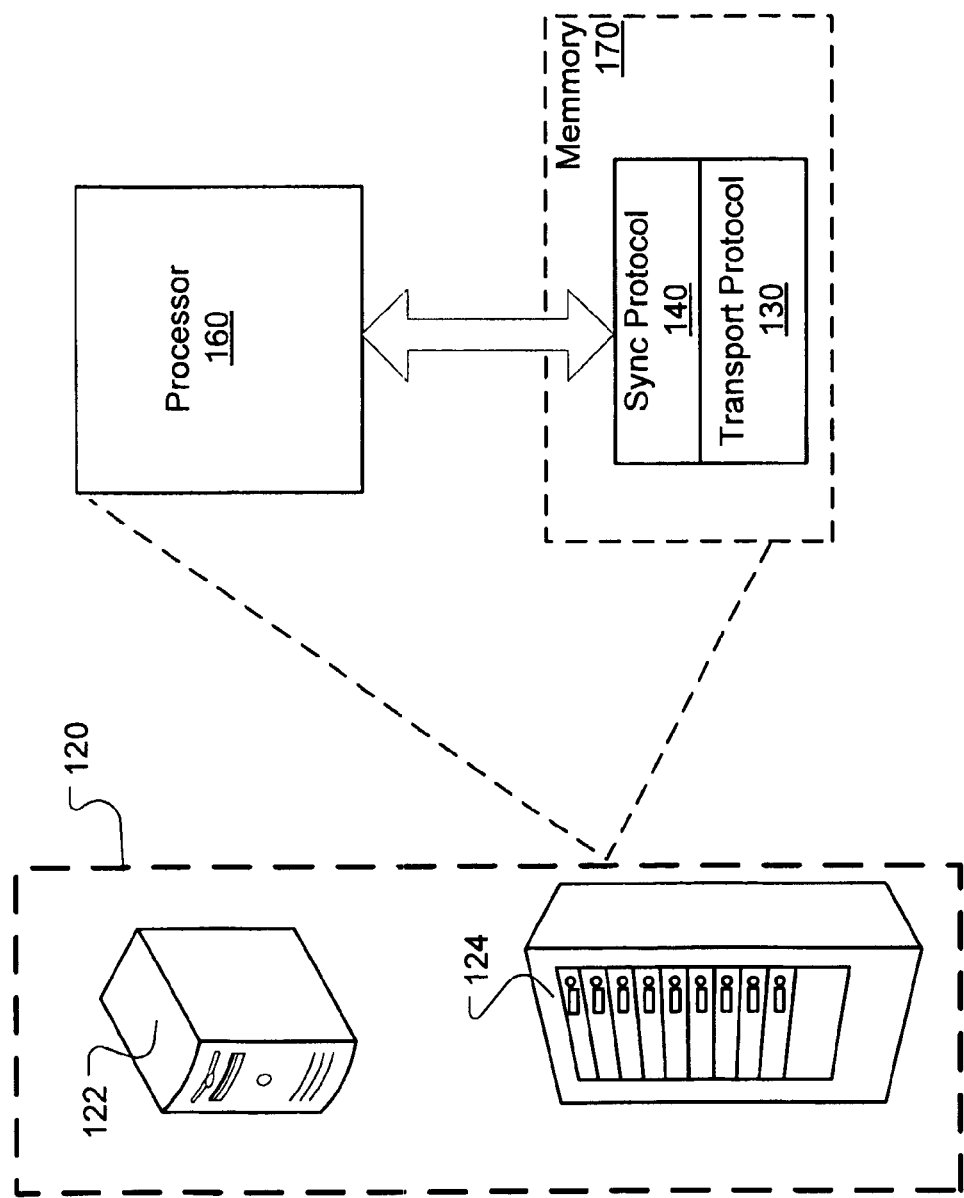
FIG. 1B shows example components of a server.

FIG. 1b shows example components of the server 120. The server 120 can include a processor 160 and a memory 170, among other components. The processor 160 can include a central processing unit (CPU) or other classes of logic machines that can execute computer programs. The memory can include nonvolatile storage devices such as a fixed hard drive or removable storage devices. The removable storage devices can include a compact flash units, USB memory sticks, etc. The memory 170 can also include volatile memories such as various forms of random access memories.

The processor 160 can operate the transport protocol 130 to open transport connections to one or more client devices 110. The processor 160 can operate the sync protocol 140 over the opened transport connections to enable data synchronization between the server 120 and the client devices 110. The transport protocol 130 and the sync protocol 140 can be loaded and running on the memory 170 to be executed or operated by the processor 160. For example, as described with respect to FIGS. 2-44b below, the processor 160 can operate the sync protocol 140 to receive a request from the client devices 110 to initiate a sync session.

Figure 1C:
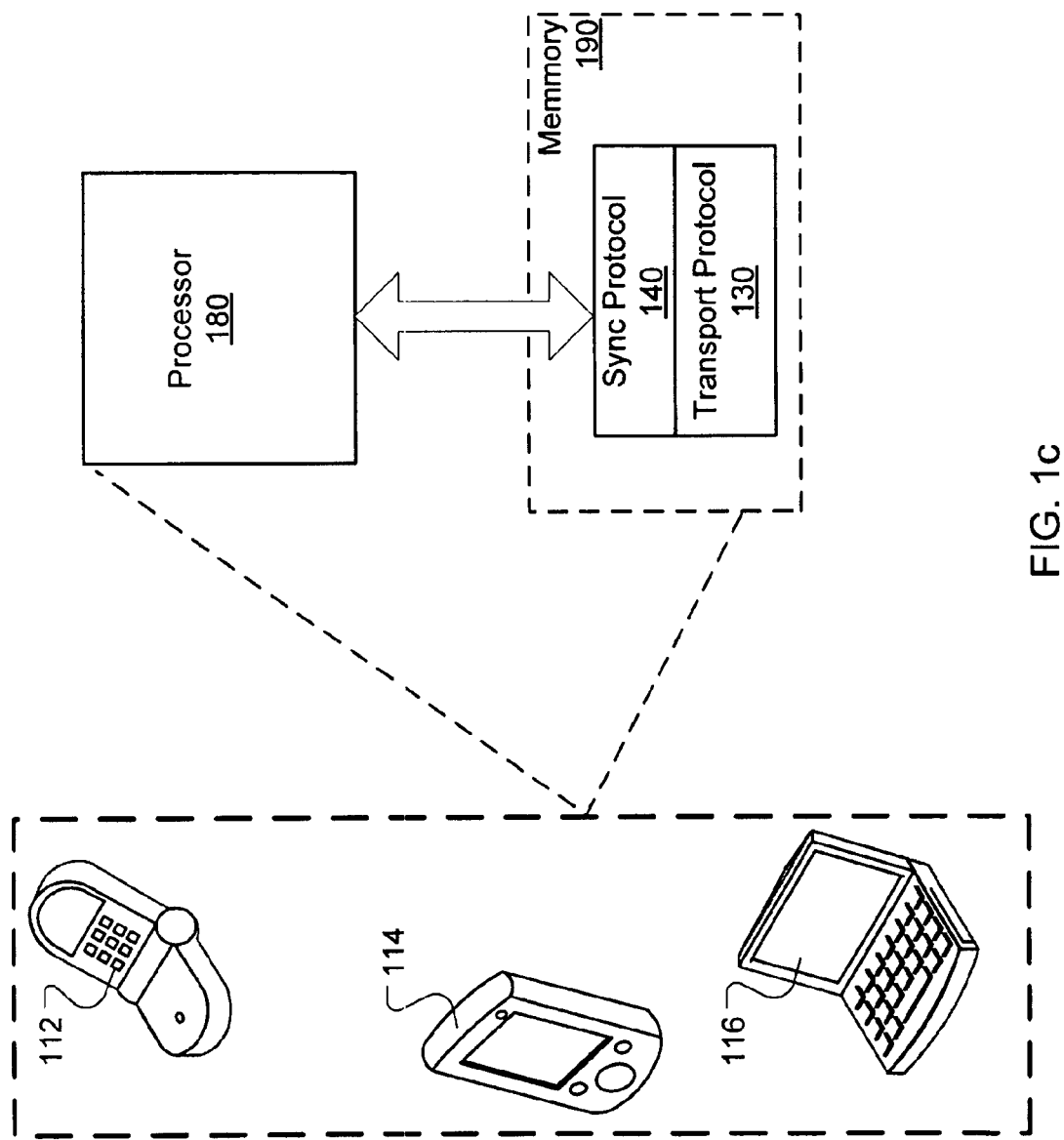
FIG. 1C shows example components of a client device.

FIG. 1c shows example components of the client devices 110. The client devices 110 can also include a processor 180 and a memory 190, among other components. The processor 180 can include a central processing unit (CPU) or other classes of logic machines that can execute computer programs. The memory can include nonvolatile storage devices such as a fixed hard drive or removable storage devices. The removable storage devices can include a compact flash units, USB memory sticks, etc. The memory 190 can also include volatile memories such as various forms of random access memories.

The processor 180 can operate the transport protocol 130 to open transport connections to one or more servers 120. The processor 180 can operate the sync protocol 140 over the opened transport connections to enable data synchronization between the client devices 110 and the server 120. The transport protocol 130 and the sync protocol 140 can be loaded and running on the memory 190 to be executed or operated by the processor 180. For example, as described with respect to FIGS. 2-44b below, the processor 180 can operate the sync protocol 140 to send a request to the server 120 to initiate a sync session.

Synchronization is a process of maintaining consistency between two distinct datastores by periodically comparing the changes which have occurred to each since the last time the datastores were known to be consistent. The datastores can include a client device 110 on one side and a server 120 on the other side. To synchronize with each other, the datastores are configured with various capabilities. For example, each datastore is configured to supply all data when requested. In addition, each datastore is configured to identify and supply changes since the time of the last synchronization. Each datastore is configured to agree on the schema to be kept in sync. Each datastore is configured to agree on the supported data representations. Each datastore is configured to agree on the semantics of synchronization primitives (i.e. add, update, delete). Further, each datastore is configured to rollback to a previous state should a problem occur during a sync to avoid corrupting the datastores.

The synchronized data follows the relational model (E-R) and is divided into "schemas" or "dataclasses" which group definitions of structured data types ("entities") Entities within a given dataclass may refer to one another via "relationships". Relationships between entities in discrete dataclasses is forbidden, and thus each dataclass is wholly independent of other dataclasses. From a user's perspective, dataclasses may appear to be managed from separate dedicated applications. For example, the "contacts" dataclass can be managed primarily by an address book application, while the "calendars" dataclass can be managed by a calendar application.

The synchronization protocol 140 enables various synchronization modes including slow, reset and fast. The first time a client device and a server sync, all data for a dataclass are exchanged to "match" existing data items that are considered identical. To optimize syncing and network bandwidth usage for subsequent sync operations, the client device and server should exchange only the data which has changed since the last time the pair synchronized. Thus, each entity (i.e., client device or server) should be capable of determining what local changes should be sent to the other entity. In addition, each entity should be able to detect whether a situation has occurred which require exchanging more data before "fast" syncing can be resumed.

The slow sync mode may be required when the client device 110 and server 120 sync for the first time to establish a common baseline for subsequent difference-only data exchange. During a slow sync, the client device 110 sends all data for a dataclass to the server 120. The server attempts to match these data items with those that are already known to the server 120. Failure to perform proper "identity matching" can result in duplicated data. The server 120 then responds with data items missing at the client device 110.

The reset sync mode is used to reset all data for the dataclass on the client device with the server's data. This can occur when the data structure has been pushed to the device 110, or if the server 120 or device 110 determine that the device's local data is corrupt. The device 110 sends no data, and the server responds with the complete data structure for the dataclass.

The fast sync mode is the most efficient mode, especially when using a limited bandwidth connection. The client device 110 sends only those data that have changed since the last sync with the server 120. The server 120 responds with only those data that have changed external to the client device 110.

A synchronization session can follow a distinct set of phases including negotiation, pull, mingle, push, and commit. The terms, "pull" and "push" can be defined relative to the server process. The client device 110 sends its local changes to the server 120 during the pull phase, and receives updates during the server's push phase.

During the negotiation phase, both sides (client device 110 and server 120) can exchange information from the previous sync session to determine what sync mode they agree to use for the current session. To help identify and organize the sync sessions, a "sync anchor" is assigned to each sync session. If the client device 110 has previously synced with the server 120, the client device 110 likely expects a specific sync mode. The client device 110 may believe that it can fast sync with the server 120, but the server 120 may desire to reset the device. When the requested sync mode is accepted by both sides, synchronization can proceed to the pull phase.

During the pull phase, the client device 110 sends its changed records (or if the sync mode is "slow", all records) to the server 120. Invalid changes may be rejected by the server 120.

Once all changes have been received, the server 120 enters the mingle phase and merges any pending updates in its database with the changes from the client device 110. The result of mingling is a set of conflicting changes and a set of updates which should be pushed to the client device 110. The server 120 can automatically resolve all conflicts using a heuristic algorithm. In some implementations, it may be desirable for the client device 110 to resolve certain conflicts. The synchronization protocol 140 can be designed to allow for conflicts to be represented and transmitted from the server 120 to the client device 110. The synchronization protocol 140 can be designed to enable conflicts to be resolved on the client device by the user to be transmitted to the sync server 120.

During the push phase, updates from the server 120 are sent to the client device 110. When all updates have been received by the client device 110, the commit phase is entered. Both sides (client device 110 and server 120) may agree that the sync was successful, persist their current sync anchors, and commit the exchanged data to their respective data stores.

At any point during a sync, either side may decide to cancel the sync and rollback any changes to the local datastore. Cancellation may occur explicitly in response to one or more of the following events: when unexpected or invalid data is sent; when the expected transitions in the sync state machine are not followed; when communications between the client device 110 and server 120 are interrupted; or when some other problems occur.

The difference in data can be synced in various granularities. When exchanging synchronization data, the client device 110 and the server 120 may send the complete data for each changed record for a record-level differencing (RLD). Alternatively, just the changed fields of each changed record can be sent for a field-level differencing (FLD). FLD may be preferred over RLD, especially when data records include many fields, or contain large amounts of data, such as the images in the contact dataclass.

The server 120 can dynamically support both RLD and FLD representations of data received from the client device 110. The data representation for the changes indicates whether the client device 110 is using RLD or FLD for a given dataclass. This provides client device datastore implementation with maximum flexibility when the complexity of maintaining meta information to support FLD is unreasonable.

When receiving RLD changes, the server 120 internally converts the changes to FLD for processing, storage and communication efficiency. The server 120 expects an RLD client device 110 to send complete records. Data fields that are supported by the client device 110 and are missing from the client device's data record are assumed to have been cleared/deleted by the client device 110. However, a mechanism can be provided to enable the client device 110 to indicate that certain data field exceptional values are unchanged without sending the values.

Identification (ID) mapping is another basic synchronization concept. Every synced datum has an universal unique record ID or UUID. For efficiency sake, the server 120 can use the UUIDs of the SyncService on Mac OS X. Alternatively, an application on the client device 110 can use its local unique IDs (LUIDs) for data to promote local datastore efficiency, for example.

The server 120 enables the client device 110 datastores to use their own LUID to refer to data items as needed. In this case, the server 120 maintains a LUID to UUID mapping to enable the client device 110 to transparently reference global records by using its own local IDs. The server 120 reestablishes new mappings when a "slow" or "reset" sync mode is accepted for the dataclass.

The synchronization protocol 140 includes a sequence of messages exchanged between the server 120 and the device 110 using a transport protocol 130, such as HTTP. The synchronization protocol 140 includes the messages exchanged on the transport protocol 130. The roles of the client device 120 and server 130 in the synchronization protocol are distinct from their roles in the communications/transport protocol. For example, for the HTTP transport 130, the device 110 is always a client with respect to the transport 130, and thus the device 110 makes requests only. However, in the message protocol of the synchronization protocol 140, both the client device 110 and server 120 may issue message commands to each other.

Transport

The transport protocol 130 manages the exchange of messages between the server 120 and client device 110. The transport protocol 130 can include HTTP transport or other suitable transports, such as Extensible Messaging and Presence Protocol (XMPP). The transport protocol 130 layer handles authentication, and thus the synchronization protocol 140 does not need to handle security/authentication processing. This enables the synchronization protocol 140 to function more efficiently and require few number of roundtrips. For example, Transport Layer Security (TLS) may be used to ensure security of the transmitted data, if desired. Also, the transport protocol 130 may perform message chunking. The transport protocol 130 need not guarantee delivery or message ordering, as the synchronization protocol 140 has the necessary information to do so and to detect message loss.

The HTTP defines eight methods or "verbs" that indicate actions to be performed on a resource. The HTTP methods includes: HEAD, GET, POST, PUT, DELETE, TRACE, OPTIONS and CONNECT. When using HTTP as the transport protocol 130, the POST method is to be used. The POST method submits data to be processed, such as data from an HTML form, to the identified resource. The data is included in the body of the request. The result of the POST method may result in the creation of a new resource or the updates of existing resources or both.

For example, the server 120 can provide the OTA sync service on a URL, such as "http://sync.mac.com/ota". When using text plist representation, the "Content-Type" header should be "text/xml". When using binary plist representation, the "Content-Type" header must be present and must be "application/octet-stream". The "Content-Length" header must indicate the size of the message. The User-Agent string is used to identify the client protocol implementation. The User-Agent string should be of the form: "Mobile/1A543". Alternatively, DeviceInfo method can be used to determine the device implementation version.

The OTA Protocol Structure

A session consists of an exchange of a number of protocol messages between the client device 110 and the server 120. The HTTP transport implementation can use cookies to maintain a session with the server 120. Either the client device 110 or the server 120 may indicate that the session is complete by setting a flag in a message header. Each message contains a series of commands that can be processed by the recipient. The client device 110 may be designated as the party that initiates the connection to the server 120.

The messages exchanged using the synchronization protocol 140 is represented as UTF-8 encoded OS X property lists (i.e. a dictionary.) This representation facilitates creation, serialization and parsing on both the client device 110 and the server 120. The synchronization protocol 140 can support both Extensible Markup Language (XML) and binary representations of plists. Binary plists can be 60% to 80% more compact than XML plists. When using XML plist representation, any binary data transmitted are serialized as base-64 encoded NSData objects and the text data are XML-escaped according to RFC 3076. Each protocol message consists of two root elements: the header and the body.

FIG. 2 is a table illustrating example header elements 210. The message header element 210 can include service, deviceid, version, userid, sequence, msisdn, final, result, etc. Corresponding to each header element 210, the type 220 of the header element is also shown. FIG. 2 also shows whether each header element 210 is required 230. Further, a short description 240 of each header element is provided in FIG. 2.

The header element 210 can identify the entity (e.g., client device 110 or server 120) sending the message, and can contain certain session control information. The header element 210 is a required element of the message, and the value of the header element is a dictionary. Elements 210 in the header can indicate the source entity ("deviceid") and target service ("service"), target account ("userid"), and message sequence number ("sequence"), for example. Also, the "version" element can indicate the synchronization protocol version being used. For example, FIG. 2 shows in the description 240 column that the current version is "1.0". These elements 210 should all be present in the message.

FIG. 2 also shows that the values of the header elements 210 service, deviceid, version, userid, sequence and msisdn are set as strings. For example, the value of the sequence element is a monotonically increasing integral value that starts at "1" for a given session. The sequence element is used to indicate message ordering for the session.

The value of the service element is a string that identifies the name of the target service, such as the sync server. The value for userid element is a string that indicates the target account for the message. The userid element can identify the principal that authenticated with the server 120 on the transport layer 130. The deviceid for the client device 110 is a string that uniquely identifies the device hardware. For iPhone® and iPod® touch devices, the deviceid element can be the Integrated Circuit Card (ICCID) value. Client devices 110 with a GSM radio may also send the msisdn element to indicate the phone number of the currently installed/active Security Information Management (SIM) card. The msisdn value may change from one session to the next, for example when the user replaces the SIM card, without affecting synchronization behavior.

The final element is present in the header when the sender (e.g., the client device 110) considers its side of the session to be complete. The final element is a Boolean with a value being TRUE. When final element flag is present, the session is considered complete. The sender may then free any session related resources, and the recipient is not required to send another message. The recipient may send another message to return outstanding command responses. However, the recipient should not send any further command requests. The values for the userid and service elements should be constant for all messages in a given session. The values for the deviceid element should remain constant for the sending entity. In other words, while the server 120 and the client device 110 may have different values, those values may not change.

The result element may be present in the header of a message to indicate the overall status for a message. For protocol brevity, an S_OK status is implied for any message without a header status. When detected that a message was not accepted, the result element is present in the header. The message may not be accepted when the data is malformed, or when the recipient encounters a session fatal condition. A non-OK status value indicates that the preceding message body was not processed, none of the message's commands were performed, and the session should be terminated. For example, a header status value of E_BadRequest (703) indicates that the previous message was malformed. A header status value of E_LimitExceeded (611) indicates that the previous message size exceeded the recipient's capability. Also, header status values of E_ServiceBusy (700), E_ServiceUnavailable (701), and E_RetryLater (704) indicate that the server 120 is experiencing difficulties in processing the request.

FIG. 3 shows an example plist 300. The example plist 300 includes a header 310 and a body 320. The header 310 includes various example header elements 312, 314, 316, 318 and 319. For example, an example deviceid element 312 having a string value of "f1234567a0745a890a86b5556d9e020202bRX8" is shown. Also, an example msisdn element having a string value of "14155338207" is shown. In addition, an example sequence element having a value of "1" is shown. The plist 300 also includes an example service element with a string value of sync. The plist 300 further includes an example version element with a string value of "1.0."

The body of the message includes an array of command requests and/or command responses to be processed by the recipient. The body element is a required element of the message, and the value of the body is represented as an array of command or command response dictionaries. The body element may be empty when the sender has no commands to send. Commands in the body are processed in command sequence order.

Both the device 110 and the server 120 may send command requests and responses within the same message. This may depend on the state of the current session.

The commands in the synchronization protocol can fall into two general categories: (1) commands that affect the state of the sender, the recipient and the processing of other commands in the message or the session; and (2) commands that do not. Whether a given stateless command successfully executes may not implicitly affect other commands in the message. Stateful commands begin with a "command family" prefix (e.g. "sync-" for all data synchronization commands). The command family prefix also provides a useful command namespace mechanism that allows the server 120 to support an arbitrary set of services for different client devices 110. In a given message, the commands in a given "command family" are processed in series, and if any command returns a non-success status, subsequent commands in that family may not be processed at all. For example, a command response with a status code that indicates that the command has not been processed (e.g., E_CommandNotProcessed) can be returned in this case.

The recipient of a non-final message includes one or more command responses for each command in the session's next message. The recipient of a final message includes one or more command responses for each command when the final message was sent on a transport layer request (i.e. a transport response is expected.) The recipient of a final message may include one or more command responses for each command when the final message was sent on a transport layer response.

Three stateless primitive commands can be defined: "get", "put" and "delete". These stateless commands may be used to implement arbitrary object exchange or Representational State Transfer (RESTful) semantics within the synchronization protocol 140. This can be used, for example, to perform management actions, to transfer device settings or capabilities, or to reference binary large objects or other meta data without requiring the server 120 to perform data synchronization operations.

When detected that the data for a given command or command response is a priori too large, the sender may split it into multiple fragments which are sent in consecutive messages. A given command may be split for various reasons and/or constraints including memory constraints, transport constraints, etc.

FIG. 4 is a table showing example command elements included in a command request. Each command request or command response is represented by a dictionary. For a command request, various command elements 410 can be provided. The example command elements can include the "name" element, the "sequence" element and the "params" element. These command elements 410 should be present for all commands. The values 420 for the "name" and "sequence" elements are strings. The value for the "params" element should be a dictionary. A dictionary is a map of key/value pairs. The keys are strings, and the values are other types, depending on the specific command. In addition, for each command element, the value type 420 is shown in the second column of the table. The third column 430 indicates whether the command element is required. Further, a short description 440 of each command element is shown in the last column.

Similar to the messages, the commands can assign an integral value to the sequence element that monotonically increases for each session. For example, the integral value can start at "1" and monotonically increase for each session. Based on the detected value of the sequence element, the recipient processes the commands in the sequence order.

The name element is a required element that indicates the command's name. The value of the name element is a string.

Command requests use the params element to pass the parameters for the command to the recipient. The params element is a required element having a value that includes a dictionary. Specific parameter elements and values may vary depending on the specific command as shown in FIG. 4.

The more element is required to be in the command when the sender needs to indicate that the command is split into fragments. Each fragment reuses the original command's "sequence" value. When present, the value of the more element is the Boolean value "TRUE".

FIG. 5 is a table showing example command response elements. The command response elements include "name", "sequence", "params", "more", "result" and "response." For each command response element, a value type 520 is provided. The values of the name and sequence elements are strings, for example. The value of the params element is a dictionary. The values of the more and response elements are the Boolean value "TRUE", and the value of the result element is an array.

The third column 530 of the table shows whether the command response elements are required. In addition, for each command response, a short description 540 is presented in the fourth column of the table. For example, the name element describes the name of the command, such as "get." Also, the sequence element for a command response corresponding to a command request should have an identical sequence value as the parent command request. Similar to the command, the params element is used by the command response to pass the parameters for the command response to the recipient. The params element is a required element having a value that includes a dictionary. Specific parameter elements and values may vary depending on the specific command response as shown in FIG. 5. In addition, the command responses use the same parameter values as their associated command requests.

The response element indicates that a message body item is a command response. Absence of the response element indicates that the body is a command request. The value of the response element is a Boolean with the value "TRUE".

Command responses use the sequence element assigned with integral values. As described above, the values assigned to the sequence element correspond to a command sequence previously sent by the recipient. The recipient processes the command responses in sequence order based on the sequence values. Normally, the sender sends exactly one command response per command received in a given message. However, if the status for the command response is S_NotCompleted (indicating that processing of the command has not yet completed), the sender may send another command response for the command in a subsequent message. Alternatively one command response can be sent per command fragment if the command was split into various fragments.

The result element is a required element included in the command responses. The value of the result element is an array of one or more status items indicating the results of the command request. When a command could not be completed in a timely manner, for example before the client's transport request times out, the recipient may return a status, such as S_NotCompleted (602) to indicate that the command was not completed. This status does not indicate success or failure of the command, but instead informs the sender of the command that results will be available later in the session. When the session terminates before a final status is received, a failure status, such as E_Failed staus is assumed. Unknown command requests result in an unknown status value, such as E_UnknownCommand (608). Also, unexpected commands for stateful commands result in a state error value, such as E_StateError (610).

When the recipient encounters an error while processing a stateful command, subsequent stateful commands for the same command family in the message may not be processed at all. In this case, the status, such as E_CommandNotProcessed (609) is returned for these commands to indicate that the commands were not processed. Depending on the situation, the sender may reattempt those commands.

Command Definitions

FIGS. 6, 7, 8, 9, 10, 11, 12, 13, 14, 15, 16, 17, 18 and 19 are tables showing examples of commands and command definitions. The synchronization protocol 140 defines these commands that are available to send during a sync session. This listing of commands is not an inclusive list. Additional commands can be added to scale and extend the synchronization protocol to provide other services.

Primitive Commands

The commands listed in FIGS. 6, 7, 8, 9, 10 and 11 are stateless commands that can modify an arbitrary resource on the recipient. The available stateless commands include "get", "put" and "delete". These stateless commands can implement object exchange or RESTful semantics within the synchronization protocol 140. Each command can include one or more parameters, such as "uri", "value", "item-type", "items", "idmap", "userid", "authtype", "auth", "version", "anchors", etc. Some of these parameters are required, while others are optional.

For example, the "uri" parameter is a required parameter with a string value assigned. The "uri" parameter can specify the desired resource to access. The synchronization protocol 140 does not specify whether the "uri" parameter represents an actual resource on the client device 110 or server 120, for example a file system path or a virtual resource. The type of the "value" parameter is determined by the client device 110 and the server 120. In addition, the type of the "value" parameter is not specified by the synchronization protocol 140. The logical type of the "value" parameter may be explicitly specified using the "item-type" parameter. Regardless, the representation of the "value" parameter must be a valid property list type.

The recipient may use the message's "userid" as the authorized principal for the purposes of limiting access to the indicated URI. If the session authorization is insufficient, the "userid", "authtype" and "auth" elements may optionally be included in the command.

FIG. 6 is a table showing the get command with its associated parameters 610 that includes "uri", "userid", "authtype" and "auth". Each of these parameters is assigned a string value 620. The table also shows whether any of the parameters are required 630. While the uri parameter is required (indicated by the check mark), the rest of the parameters may be optionally included with the get command. Also, the descriptions 640 of the parameters are provided. The value of the uri parameter describes the URI of a data object to retrieve. The value of the optional userid parameter describes whether to optionally override the message's userid. The value of the optional authtype parameter can describe the optional authentication type. The value of the optional auth string value can describe the optional authentication credential.

FIG. 7 is a table showing example parameters 710 for the get command response. The example parameters include "uri", "value" and "item-type." The associated parameter value 720 is a string for these parameters. The fourth column 730 shows that the uri and value parameters are required while the item-type is optional. The descriptions 740 of the parameters are also shown. Similar to the get command, the uri parameter of the get command response describes the URI of the data object requested by the get command. The value parameter describes the value of the URI. For example, the get command enables the sender to request a desired data object or value from the recipient. In response, the recipient sends a get command response to the sender of the get command. The get command response includes a value parameter to return the result value for the URI indicated by the get command. Further, the optional item-type parameter for the get command response describes the type of the value.

FIG. 8 is a table showing example parameters for the put command. The put command enables the sender to transfer an arbitrary data object to the recipient. The example parameters 810 include "uri", "value", "item-type", "userid", "authtype" and "auth". The table shows that each of these parameters 810 is assigned a string parameter type 820. Also, the tables show whether the parameters are required 830. For example, the uri and value parameters are required while the rest are optional. The last column shows the description 840 of each parameter 810. The value of the uri parameter represents the URI of the data object to replace. The value parameter specifies the value to be put to the recipient. The item-type parameter describes the logical type of the value. The value of the optional userid parameter describes whether to optionally override the message's userid. The value of the optional authtype parameter can describe the optional authentication type. The value of the optional auth string value can describe the optional authentication credential.

FIG. 9 is a table showing example parameters 910 for the put command response. In response to the put command, the recipient sends a put command response that includes the uri parameter. The uri parameter is a required parameter as shown by the check mark in the fourth column 930. The parameter type 920 is a string for the uri parameter. Similar to the put command, the uri parameter describes 940 the URI of the data object that was replaced in response to the put command.

FIG. 10 is a table showing example parameters for the delete command. The delete command includes various parameters 1010 such as "uri", "userid", "authtype" and "auth." The parameter type 1020 is a string for these parameters. The uri parameter is required as shown by the check mark in the fourth column 1030. The rest of the parameters are optional. The descriptions 1040 of the parameters 1010 are similar to those described for the get and put commands. The delete command enables the sender to request removal of the specified URI.

FIG. 11 is a table showing an example parameter 1110 for the delete command response. The delete command response includes a uri parameter. The table shows that the uri parameter type 1120 is a string. The uri parameter is required 1130 and thus included in the delete command response. The table also includes a description 1140 of the parameters. For example, the string type uri parameter describes the URI of the object deleted in response to the delete command.

The commands listed in FIGS. 12, 13, 14, 15, 16, 17, 18 and 19 are stateful commands. The synchronization protocol 70 also provides stateful sync-family commands and command responses. The stateful command includes sync-start, sync-changes, sync-commit and sync-cancel. These stateful commands enable structured data synchronization between the protocol client device 110 and server 120. Each of the stateful commands and command responses include the "uri" parameter to identify a dataclass state machine to be affected by a given command.

FIG. 12 is a table showing example parameters 1210 for the sync-start command. The sync-start command enables the creation of a sync state machine for a given dataclass with the recipient. The example parameters 1210 include "uri" and "anchors." The parameter type 1220 is a string for the uri parameter. The parameter type 1220 is a dictionary for the anchors parameter. The "uri" and "anchors" parameters are required parameters as shown by the check mark in the third column 1230.

The table also includes a description 1240 for each parameter. For example, the uri parameter indicates the dataclass names, such as the string "com.apple.Contacts" for contacts or the string "com.apple.Calendars" for calendars. When detected that the recipient does not support the dataclass, the status E_NotSupported (612) is returned. When detected that the dataclass is not enabled, the status E_NotAllowed (604) returned. In both these cases, the status "param-name" element should be present and should have the value "uri" to indicate that the uri parameter was the cause of the returned status. The anchors parameter contain information used during the sync negotiation phase. The information can include the requested sync mode ("mode"); the datastore versions ("device_version","serverversion"); and sync anchors ("last_device_anchor","next_device_anchor","last_server_anchor","next_serveranchor"). The "device_version" parameter for the anchor element describes the version of the client device 110. The "server_version" parameter for the anchor element describes the version of the server process 120. The anchors parameter can include device, server, filter and reset anchors. The anchors can be used to request a sync mode. The default sync mode is the fast sync mode. The anchors can be used to specify a sync direction. The default sync direction is "twoway", which indicates that changes will be sent from the client device 110 to the server process 120 as well as from the server process 120 to the client device 110.

FIG. 13 is a table that shows example parameters for the sync-start command response. The example parameters 1310 for the sync-start command response can include the "uri" and "anchors" parameters. The parameter types 1320 for the uri and anchors parameters are a string and a dictionary respectively. The table also shows whether these parameters are required parameters 1330. The descriptions 1340 of the parameters are also shown in the table. The uri parameter describes the dataclass names, such as contacts, calendars, etc. The anchors parameter can be provided for the client device 110, server 120, filter and reset. In addition, the anchors parameter can be used to indicate the requested sync mode, such as fast, slow, and reset. The default sync mode is fast.

When the recipient is willing to sync using the submitted information, the recipient returns a OK status S_OK (600) with the sync-start command response. When the recipient is willing to sync with adjusted parameters (e.g. using a different sync mode than the client requested), the recipient returns a failed-negotiation status, such as E_NegotiationFailed (613). When the recipient does not support the supplied sender's version (e.g. "device_version") the recipient returns a status, such as the E_VersionNotSupported (612) status to indicate that the version is not supported. When the recipient does not support the desired sync direction (e.g. "direction"), the recipient returns a status, such as the E_NotSupported (614) to indicate that desired sync direction is not supported. In all these cases, the status includes the "param-name" parameter with the value "anchors" indicating that elements in the "anchors" parameter of the command were the cause of the unsuccessful status. In addition, the recipient can indicate the desired sync mode and anchors in the command response's "params" dictionary.

Figure 28:
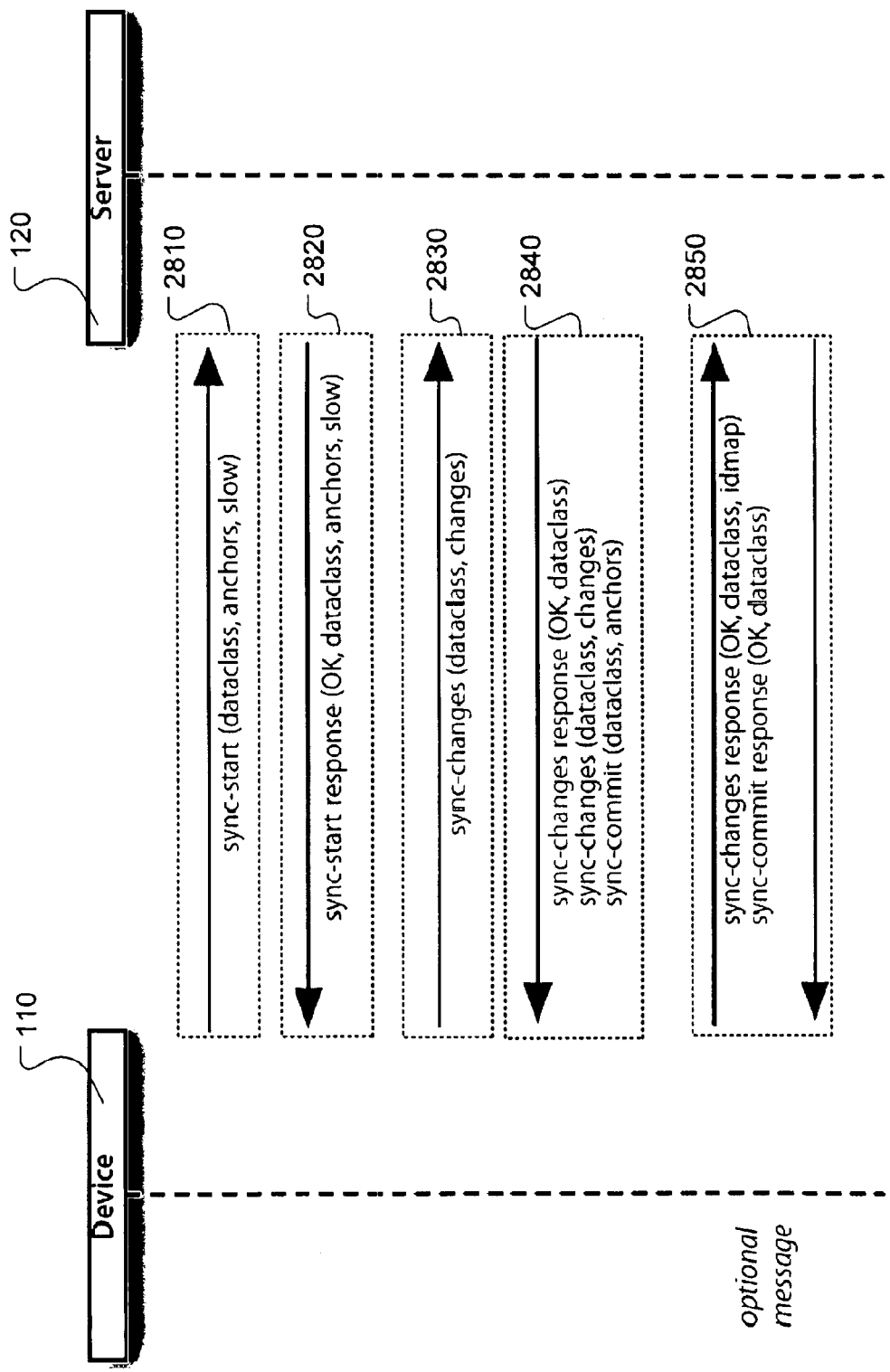
FIG. 28 illustrates an example of a slow sync.

When the client device 110 wishes to sync multiple dataclasses in parallel, the client device 110 sends a separate "sync-start" command request for each dataclass as shown in FIG. 28 below. These commands are included in the same message to enable the server 120 to process the commands within the same sync job. When the server 120 accepts the "sync-start" command received from the client device 110, the client device 110 begins sending "sync-changes" commands. Sending the "sync-start" command during a session which has already started syncing results in a state error status such as E_StateError (610) status.

When syncing multiple dataclasses in a single session, commands for each dataclass operate on distinct state machines. Usually, the server 120 waits until all dataclasses have completed the pull phase or cancelled before mingling the changed data.

FIG. 14 is a table showing example parameters for the sync-changes command. The parameters 1410 can include "uri", "itemtype", "items", "anchors" and "idmap." The parameter type 1420 for the uri and itemtype parameters is a string. The parameter type for the anchors, items and idmap parameters is a dictionary. The table shows in column four 1430 that the uri, itemtype and items parameters are required while the idmap and anchors are optional. The table also includes descriptions 1440 of these parameters. The uri parameter describes the dataclass for the changes requested. The itemtype parameter describes type of the item or data identified in the sync-changes command. The items parameter describes a dictionary of items, such as format/type that depends on the itemtype. The associated keys for the items parameter can be device recordids. The idmap parameter describes a dictionary of GUID-LUID pairs. The associated keys are server record ids and the values are device record ids. The anchors parameter may be included as a "checkpoint anchor". When present, the receiver updates its anchors with the supplied value. Should the session become interrupted, the recipient may start a subsequent sync session with the check point anchors and continue to sync normally without falling into slow sync mode.

The sync-changes command enables the client device 110 to send changes to the server 120. Alternatively, the server 120 can send updates to the client device 110. The uri parameter indicates the dataclass of the data items to be updated or changed. The type of data item being sent is indicated by the itemtype parameter. The itemtype parameter can indicate that the item parameter represents either full records ("records") or field-level changes ("changes"). When detected that the client device 110 requires id mapping, data items are keyed by the device LUID in the items parameter. The format of the dictionaries for the items parameter depends on the item-type. The values of the items parameter are of homogeneous item-type. The items parameter can be an empty array to indicate that no more items need to be sent. For example, the empty array can indicate that there are no changes, or there are no records.

When detected that there are no device changes or the sync mode is "reset", the client device 110 sends a "sync-changes" command with an empty array for the "items" parameter. The "more" Boolean flag element is also included if all appropriate data items for the dataclass are not included in the command params. The "more" Boolean flag element can be used to break up large amounts of synchronization data into smaller chunks. This is useful when the size of the data to be exchanged is larger than the capability of the recipient. For example, the recipient may have message size limitations. Alternatively, the "more" Boolean flag element can enable exchange of multiple item-types for a given dataclass in a single session. When the server 120 has received the last "sync-changes" chunk for all dataclasses from the client device 110, the server 120 synchronizes all supplied data with the central database. Then the client-server roles within the protocol session become reversed.

At this point, the client device 110 begins processing commands from the server 120. The client device 110 can also return command responses to the server 120. Any synchronization data updates from the server are then sent in "sync-changes" commands. When no updates are needed, the server 120 sends a "sync-changes" command with an empty array for the "items" parameter. While processing "sync-changes" command requests from the server 120, the client device 110 responds to these commands, and includes any required mapping information for add transactions in the command response's "params" using the "idmap" parameter. The "idmap" parameter is sent in a "sync-changes" command from the client device to update existing mappings. For example, id mappings may be updated independent of the server 120 changing the data entities. Sending the "sync-changes" command during a session before the "sync-start" or after the "sync-commit" or the "sync-cancel" results in an error status, such as the E_StateError (610) status. The device 110 may omit sending "sync-changes" command response and defer sending the "idmap" parameter until the "sync-changes" command of the subsequent sync session. This may be done in order to reduce the number of transport roundtrips necessary to complete the sync session.

FIG. 15 is a table showing example parameters for the sync-changes command response. The parameters 1510 includes "uri", "anchors" and "idmap." The table includes the parameter types 1520 for these parameters. The uri parameter is a string type and the anchors and idmap parameters are dictionaries. The table also includes an indication of whether the parameters are required 1530. The uri parameter is required while the anchors and idmap parameters are optional. The table also includes descriptions 1540 of these parameters. The uri parameter indicates the dataclass for the requested changes. The anchors parameter is checkpoint anchors used to indicate specific points where the last sync session left off. The idmap parameter is a dictionary of GUID-LUID pairs with keys that include server record ids. The values of the keys can include device record ids.

FIG. 16 is a table showing example parameters for the sync-commit command. The parameters 1610 for the sync-commit command include "uri" and "anchors." The sync-commit command is used to commit the sync operation. The command indicates that the sender has already committed and is telling the recipient to commit as well. The table shows whether the parameters are required 1630. For example, the "uri" parameter is required while the anchors parameter is optional.

The table also shows the parameter type 1620 for the parameters. The uri parameter is a string type, and the anchors parameter is a dictionary. The table also shows the descriptions 1640 of the parameters. The uri parameter indicates the dataclass to commit the sync changes. The anchors parameter is used by the client device 110 to send "next_device_anchor" for the server 120 to store. In response, the server 120 sends the "next_server_anchor" to the device 110 in the sync-commit command. In addition, the sync mode to use in the next sync is indicated and returned in the sync-commit command. Sending the "sync-commit" command during a session before the final "sync-changes" or after "sync-commit" or "sync-cancel" results in an error status, such as E_StateError (601) error status.

FIG. 17 is a table showing example parameters for the sync-commit command response. The parameter 1710 includes the "uri" parameter. The parameter type 1720 for the uri parameter is a string. As shown in the fourth column 1730 of the table, the uri parameter is a required parameter that is included in the sync-commit command response. The description 1740 of the uri parameter shows that the uri parameter indicates the dataclass committed during the sync session. The device 110 may omit sending "sync-commit" command response in order to reduce the number of transport roundtrips necessary to complete the sync session. By submitting the sync anchor received in the "sync-commit" command as the anchors parameter in the "sync-start" command of the next session, the server 120 can infer that the previous "sync-commit" was received.

FIG. 18 is a table showing example parameters for the sync-cancel command. The sync-cancel command is used to cancel the sync operation. The sync-cancel command indicates that the sender has already cancelled and is telling the recipient to cancel as well. The recipient should rollback any changes it has made for the dataclass to the state represented by the last received sync anchor. The table shows that the parameters 1810 for the sync-cancel command include the "uri" parameter and the anchors parameter. The parameter type 1820 for the uri parameter is a string and the anchors parameter is a dictionary. The table also shows in column four 1830 whether the parameters are required. The uri parameter is required while the anchors parameter is optional. The table also shows the descriptions 1840 of the parameters. The uri parameter indicates the dataclass to cancel the sync. The anchors parameter may be used to specify the anchors and/or sync mode to use for the next sync session. Sending the "sync-cancel" command during a session before "sync-start"

or after "sync-commit" or "sync-cancel" results in an error status, such as the E_StateError (610) error status. The device 110 may omit sending "sync-cancel" command response in order to reduce the number of transport roundtrips necessary to complete the sync session. By submitting the sync anchor received in the "sync-cancel" command as the anchors parameter in the "sync-start" command of the next session, the server 120 can infer that the previous "sync-cancel" was received.

FIG. 19 is a table showing example parameters for the sync-cancel command response. The available parameter 1910 for the command response includes the "uri" parameter. The parameter type 1920 for the uri parameter is a string. The table also shows in the fourth column 1930 an indication of whether the parameter is required. The uri parameter is required to be included in the command response as indicated by the check mark. The table also includes a description 1940 of the uri parameter. The uri parameter indicates the dataclass to cancel the sync.

Status

FIG. 20 is a table showing example status elements. The example status elements are show in the first column 2010 with the corresponding values shown in the second column 2020. The third column 2030 of the table shows whether the status element is required. Also, the last column 2040 of the table shows a short description for each status element.

The status resulting from the processing of a given command or message is represented by the "status" element. A single status element may appear in the message header. When the message was not processed, the corresponding status element is included in the message header. An array of "status" elements is included in the "results" parameter of command responses.

Status elements indicate the results of a command request. A status item is a Dictionary. The dictionary may contain the "status" element and contain the "code" elements to indicate the result status of the corresponding command request. The value for the "status" element is a string. The value for the "code" element includes an integer string or an integer. The "description" element is an optional element that may be present in the command. The value of the "description" element is a string. The "description" element is purely informational and has no effect on the processing of the command.

The "param-name", "param-key" and "param-index" elements MAY be present. They are used to provide multi-status responses for certain commands. The "param-name" value MUST be a String and indicates to which parameter in the command request this Status item corresponds. The "param-index" value MUST be either a String or an Integer. It MUST be present if the "param-name" element is present and it's value in the command request was an Array. The value of the "param-index" indicates the index of the "param-name" item in the command request to which this Status item corresponds. Index values are zero-based. The "param-key" value MUST be a String. It MUST be present if the "param-name" element is present and it's value in the command request was a Dictionary. The value of the "param-key" indicates the value of the key of the "param-name" item in the command request to which this Status item corresponds.

The "param-name" "param-key" and "param-index" elements may also be present. They are not required elements and can be used to provide multi-status responses for certain commands. The value of the "param-name" status element is a string that indicates to which parameter in the command request this status element corresponds. The value of the "param-index" element can be either a string or an integer. The "param-index" status element is included in the status dictionary when the "param-name" status element is present and the value of the parameter matching the value of the "param-name" status element in the command request was an array. The value of the "param-index" status element indicates the index in the array parameter item for the parameter whose name corresponds to the value of the "param-name" status element in the command request to which the status element corresponds. The value of the index status element is zero-based. The value of the "param-key" element is a string that indicates to which parameter in the command request this status element corresponds. The value of the "param-key" status element is a string. The "param-key" status element is included in the status dictionary when the "param-name" status element is present and the value of the parameter matching the value of the "param-name" status element in the command request was a dictionary. The value of the "param-index" status element indicates the key in the dictionary parameter item for the parameter whose name corresponds to the value of the "param-name" status element in the command request to which the status element corresponds.

The indices in a status refer to the index of the param which resulted in the status, if the original param was an Array. Indices start counting from a zero-basis. This zero-basis mechanism enables the a sparse array of statuses to be returned. For example, consider a command (named "examplecommand") shown below that has a parameter "items" which is an array. Suppose that all but two of the items in the command are well formed with the second and fifth items having values ("bad").

```
<dict>
<key>name</key>
<string>examplecommand</string>
<key>sequence</key> <string>3</string>
<key>params</key>
<dict>
<key>items</key>
<array>
<string>good</string>
<string>bad</string>
<string>good</string>
<string>good</string>
<string>bad</string>
<string>good</string>
<string>good</string>
</array>
</dict>
</dict>
```

The command response to the above "examplecommand" may be presented as follows:

```
<dict>
<key>name</key>
<string>examplecommand</string>
<key>sequence</key> <string>3</string>
<key>response</key> <true/>
<key>result</key>
<array>
<dict>
<key>code</key>
<string>602</string>
<key>status</key>
<string>S_Ok</string>
</dict>
<dict>
<key>code</key>
<string>607</string>
<key>param-name</key>
```

```
<string>items</string>
<key>param-index</key>
<string>1</string>
</dict>
<dict>
<key>code</key>
<string>607</string>
<key>param-name</key>
<string>items</string>
<key>param-index</key>
<string>4</string>
</dict>
</array>
</dict>
```

This shows that there are multiple statuses to be returned for the command with all but the ones indicated being successful. However, the value supplied for the param "items" at index 1 (counting from zero, so, the second item in the command list) was a bad value (status code 607). The same case for the 5th item (index 4). This mechanism enables non-reporting of statuses for every other item that succeeded. This mechanism can significantly decrease the bandwidth usage requirement when numerous items are sent to the server and only a few fail.

When multiple statuses need to be returned in a single command response, a sparse array of statuses may be represented by including a status, such as S_MultiStatus (601) as the first element of the status array. Subsequent status elements may then indicate the parameter index value and a distinct status for any failed parameter elements for which the parameter type was an array. Alternatively, subsequent status elements may indicate the parameter key value and distinct status for any failed parameter elements for which the parameter type was a dictionary.

Status codes in a certain range, such as the status code range 600-699 can be reserved for general statuses. Status codes in another range, such as the range 700-799, can be reserved for errors returned by the server and generally lead to termination of the current session.

FIG. 21 is a table showing example status codes for the statuses available to be included in the commands and the command responses. The first column 2110 describes the available statuses. The associated status codes are shown in the second column 2120. The third column 2130 shows a description for each status. The last column 2140 shows the parent element or parameter for each status.

The table describes success statuses and error statuses. In the example shown in FIG. 21, the "S_OK" status is assigned the code 600 to indicate a success. The parent element may be a message header or command response. The other success status is the "S-MultiStatus" status assigned to code 601 to indicate a success with multi-valued statuses. The parent element is a command response.

The error statuses include the "E-NotCompleted" status assigned to code 602 to indicate that command processing for the command has not yet completed. The parent element is a command response. The "E_NotFound" error status is assigned to code 603 to indicate that the indicated data object or URI was not found. The parent element is a command response. The "E_NotAllowed" error status is assigned to code 604 to indicate that the operation is not permitted that may be due to insufficient access rights, for example. The parent element is a command response. The "E_Missing-Param" error status is assigned to code 605 to indicate that the command was missing a required parameter. The "E_ParamError" error status is assigned to code 606 to indicate that a supplied parameter was incorrect. The parent element is a command response. The "E_BadValue" error status is assigned to code 607 to indicate that a bad value was supplied. The parent element is a message header or command response. The "E_UnknownCommand" is assigned to code 608 to indicate that an unknown command was issued and ignored. The parent element is a command response. The "E_CommandNotProcessed" error status is assigned to code 609 to indicate that a command was not processed due to errors processing a previous command. The parent element is a command response. The "E_StateError" is an error status assigned to code 610 to indicate that an unexpected command was received based on the command family's current state machine. The parent element is a command response. The "E_LimitExceeded" error status is assigned to code 611 to indicate that too many items were supplied. The parent element is a command response. The "E_VersionNotSupported" error status is assigned to code 612 to indicate that the protocol or command version is not supported. The parent element is a message header or command response. The "E_NegotiationFailed" error status is assigned to code 613 to indicate that the sync mode negotiation failed. The parent element is a command response. The "E_NotSupported" error status is assigned to code 614 to indicate that an unsupported or unimplemented operation was attempted. The parent element is a message header or command response. The "E_Failed" error status is assigned to code 615 to indicate a generic failure. The parent element is a message header or command response. The "E_Canceled" error status is assigned to code 616 to indicate that the current state machine has been cancelled. The parent element is a command response. The "E_ServiceBusy" error status is assigned to code 700 to indicate that the server 120 is too busy and could not process the message. This status code also indicates that the device 110 should retry the command again soon. The parent code is a message header. The "E_ServiceUnavailable" error status is assigned to code 701 to indicate that the serve 120 is unavailable and could not process the message. This status code also indicates that the device 110 should retry again soon. The parent element is a message header. The "E_ServiceError" error status is assigned to code 702 to indicate that the server 120 had an internal error. The parent element is a message header or command response. The "E_BadRequest" error status is assigned to code 703 to indicate that the server 120 could not understand the message. The parent element is a message header. The "E_RetryLater" error status is assigned to code 704 to indicate that the server 120 needs the client device 110 to retry at a later time. The parent element is a message header.

FIG. 22 is a table showing the effects of receiving a given status for a command. The indicator "C" indicates that a failure for that command receiving the status only. The indicator "F" indicates a termination of the command family state machine. An example of the termination of the state machine for "sync" commands is an indication that a "sync-cancel" is forthcoming. The indicator "M" indicates that the message was not processed. The indicator "S" indicates that the session will terminate.

The effect of receiving the "E_NotFound" error status is a failure for the get, put and delete commands. For the sync-start, sync-changes, sync-cancel and sync-commit commands, the dataclass state machine is terminated. The effect of receiving the "E_NotAllowed" error status is a failure for the get, put and delete commands. For the sync-start, sync-changes, sync-cancel and sync-commit commands, the dataclass state machine is terminated. The effect of receiving the "E_MissingParam" error status is a failure for the get, put and delete commands. For the sync-start, sync-changes, sync-cancel and sync-commit commands, the dataclass state machine is terminated. In addition, the message is not processed. The effect of receiving the "E_ParamError" error status is a failure for the get, put and delete commands. For the sync-start, sync-changes, sync-cancel and sync-commit commands, the dataclass state machine is terminated. The effect of receiving the "E_BadValue" error status is a failure for the get, put and delete commands. For the sync-start, sync-changes, sync-cancel and sync-commit commands, the dataclass state machine is terminated. In addition, the message is not processed. The effect of receiving the "E_UnknownCommand" is a failure for the get, put and delete commands. For the sync-start, sync-changes, sync-cancel and sync-commit commands, the dataclass state machine is terminated. The effect of receiving the "E_CommandNotProcessed" error status is a failure for the get, put and delete, sync-start, sync-changes, sync-cancel and sync-commit commands. The effect of receiving the "E_StateError" error status is that for the sync-start, sync-changes, sync-cancel and sync-commit commands, the dataclass state machine is terminated. The effect of receiving the "E_LimitExceeded" error status is a failure for the get, put and delete commands. For the sync-start, sync-changes, sync-cancel and sync-commit commands, the dataclass state machine is terminated. In addition, the message is not processed. The effect of receiving the "E_VersionNotSupported" error status is a failure for the get, put and delete commands. For the sync-start, sync-changes, sync-cancel and sync-commit commands, the dataclass state machine is terminated. In addition, the session will terminate. The effect of receiving the "E_NegotiationFailed" error status is a failure for the sync-start command. The effect of receiving the "E_NotSupported" error status is a failure for the get, put and delete commands. For the sync-start, sync-changes, sync-cancel and sync-commit commands, the dataclass state machine is terminated. The effect of receiving the "E_Failed" error status is a failure for the get, put and delete commands. For the sync-start, sync-changes, sync-cancel and sync-commit commands, the dataclass state machine is terminated. In addition, the session will terminate. The effect of receiving the "E_Canceled" error status is that the dataclass state machine is terminated for the sync-start, sync-changes, sync-cancel and sync-commit commands. The effect of receiving the "E_ServiceBusy" error status is that the session will be terminated. The effect of receiving the "E_ServiceUnavailable" error status is that the session will be terminated. The effect of receiving the "E_ServiceError" error status is that the session will be terminated for all commands. The effect of receiving the "E_BadRequest" error status is that the session will be terminated. The effect of receiving the "E_RetryLater" error status is that the session will be terminated.

Anchors

Synchronization state information such as the sync mode, sync direction, agent versions, and sync anchors are exchanged between the device and server at various times. The "anchors" element included in the commands and command responses, as shown in FIGS. 12-20, is used to bundle this information. The "anchors" element is implemented as a Dictionary.

FIG. 23 is a table showing example keys for the anchors element. The table includes columns that show examples of sync anchor keys 2310, the associated key types 2320 and descriptions 2330 of the keys. The "mode" key represents the desired or negotiated sync mode. The mode key can optionally be present in the anchors element. When present, the value of the mode key is implemented as a String, and the string value includes "slow", "fast", or "reset" to represent the sync mode. When the value of the mode key is not present, the receiver of the message infers the value to be "fast". Thus, in absence of the mode key value indicated by the sender, the fast sync mode is assumed by the recipient.

The "direction" key represents the desired or negotiated sync direction. The value of the direction key can optionally be present in the anchors element. When present, the value of the direction key is implemented as a String, and the string value can include "to_server", "to_device", or "twoway". Thus, these values indicate the sync direction as syncing from the device 110 to the server 120, syncing from the server 120 to the device 110 or both. When the value of the direction key is not present, the receiver infers the value as "twoway".

The "device_version" key is sent by the device 110 and represents the device datasource agent version. When present, the value of the device_version key is implemented as a String. This information can be used by the server 120 to infer behaviors or capabilities specific to a given version of the device software. The server 120 can determine that synchronization is not permitted with a given device agent version, for example.

The "server_version" key is sent by the server 120 and represents the server's datasource agent version. When present, the value of the server_version key is implemented as a String. This information can be used by the device 110 to infer behaviors or capabilities specific to a given version of the server software. The device 110 can determine that synchronization is not permitted with a given server agent version, for example.

The actual anchors are exchanged using the keys "last_device_anchor", "next_device_anchor", "lastserveranchor" and "next_serveranchor". The value for each of these keys can be present in the "anchors" dictionary. When present, the value for each of these keys is implemented as a String. When not present, the recipient infers the last known value for the keys.

The values of the keys for the anchors element are considered opaque, and an entity should not attempt to decode or infer meaning from another entity's anchor keys. For example, a client device should not make any assumptions regarding the "next_server_anchor" or the "last_server_anchor".

Synchronization Protocol Features

When the client device 110 sends the differences (i.e., the changed, deleted or new data) to the server 120, the client device 110 indicates whether "record level differences" (RLD) or "field level differences" (FLD) is used via the "item-type" parameter of the "sync-changes" command. The value "change" in the "item-type" parameter indicates FLD, while the value "record" indicates RLD. Devices that support RLD send the entire data set for a given changed record for a particular dataclass. In contrast, devices that support FLD send only the changed properties for changed records in the data set for the dataclass.

An optimization is supported for RLD, which enables the client device 110 to send a special value, such as "+no-change+" indicating that a given property has not changed, and has not been deleted. This helps to avoid sending large data items, such as contacts images that have not changed.

Id Mapping

When detecting that the datastore, in the client device 110 for example, for a dataclass wishes to use id mapping, the "idmap" parameter can be included in the command or the command response for a "sync-changes" command from the server 120. The value of the "idmap" parameter is a dictionary that maps server universal unique identifications (UUIDs) to client device 110 local unique identifications (LUIDs). Thereafter, the server 120 refers to the mapped entity using the client device 110 LUID.

Optimizations

Broken sessions can cause message/packet loss for wireless communications. The synchronization protocol 140 enables recovery from broken sessions without falling out of "fast" sync. By maintaining "fast" sync even in the event of a broken session, the number of communication round trips are reduced. The reduced number of roundtrips can reduce or minimize message/packet loss.

The synchronization protocol 140 is designed to minimize the number of transport messages (HTTP request/response roundtrips) in normal circumstances. The ability to remain in "fast" sync mode can minimize the bandwidth usage and effort for each sync process by exchanging smaller amounts of data. Moreover, frequent fast syncs mean the device 110/server 120 pair never drift much from one another. In other words, the device 110 and the server 120 remain more in sync than possible without fast sync. Also, this wireless "trickle syncing" can yield a better user experience.

Certain events can cause a fast syncing pair (e.g., client device 110 and server 120 pair) to resort to a less efficient sync mode (e.g., slow sync mode). These events can include device data corruption, interrupted sync sessions, failure to agree on consistent sync anchors, data structure reset (e.g., when a user pushed an entirely new data set for the dataclass from another machine). The synchronization protocol 140 can avoid being pessimistic and minimize ore eliminate the need to fall back to slow sync whenever a problem occurs.

The synchronization protocol 140 implements various techniques to optimize data sync between the client device 110 and the server 120. For example, optimization techniques include sync phase compression that enables optimistic negotiation and commit; implementing multiple dataclass state machines in parallel; using sync anchor checkpoints; and enable session robustness.

Figure 24:
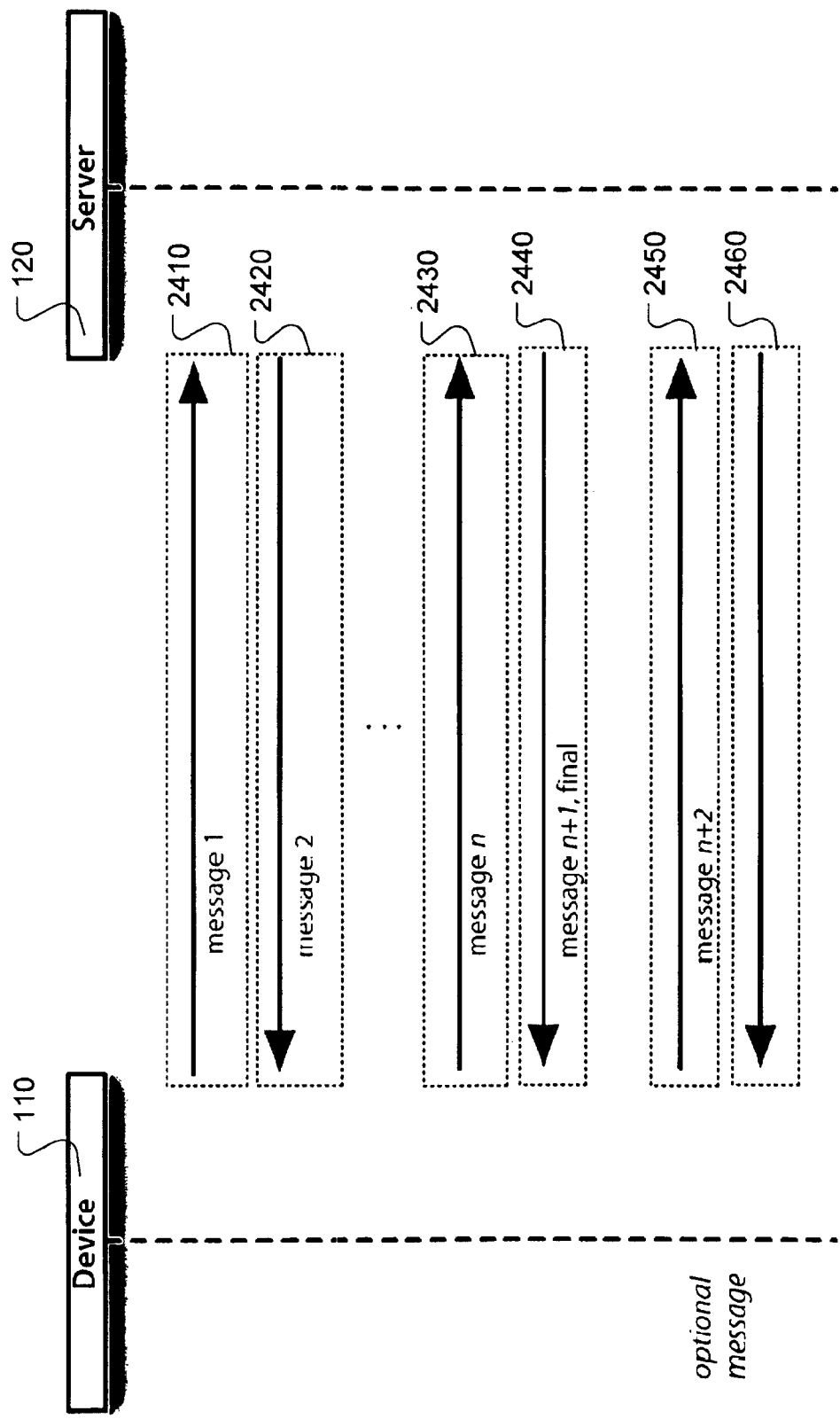
FIG. 24 shows an example of a sync session.

FIG. 24 shows an example of a sync session. A sync session between the client device 110 and the server 120 includes exchange of various messages 2410, 2420, 2430, 2440, 2450 and 2460. For example, message 1 2410 is sent by the sender to the recipient. In the example shown in FIG. 24, the sender is the client device 110 and the recipient is the server 120. Message 1 2410 includes the sync-start command to negotiate a sync mode for the sync session. In response to message 1 2310, the recipient sends message 2 2420 that includes a command response, such as sync-start command response. The command response includes a status to indicate whether the command included in message 1 2410 was successful, failed, etc. End the end of message 2 2420, a first round trip is concluded. As needed, additional messages n, n+1, n+2, etc. can be exchanged to complete a sync session. The sync session can end at the receipt of the final message n+1, for example. In some implementations, additional optional messages 2450, 2460, etc. can be exchanged.

Figure 25:
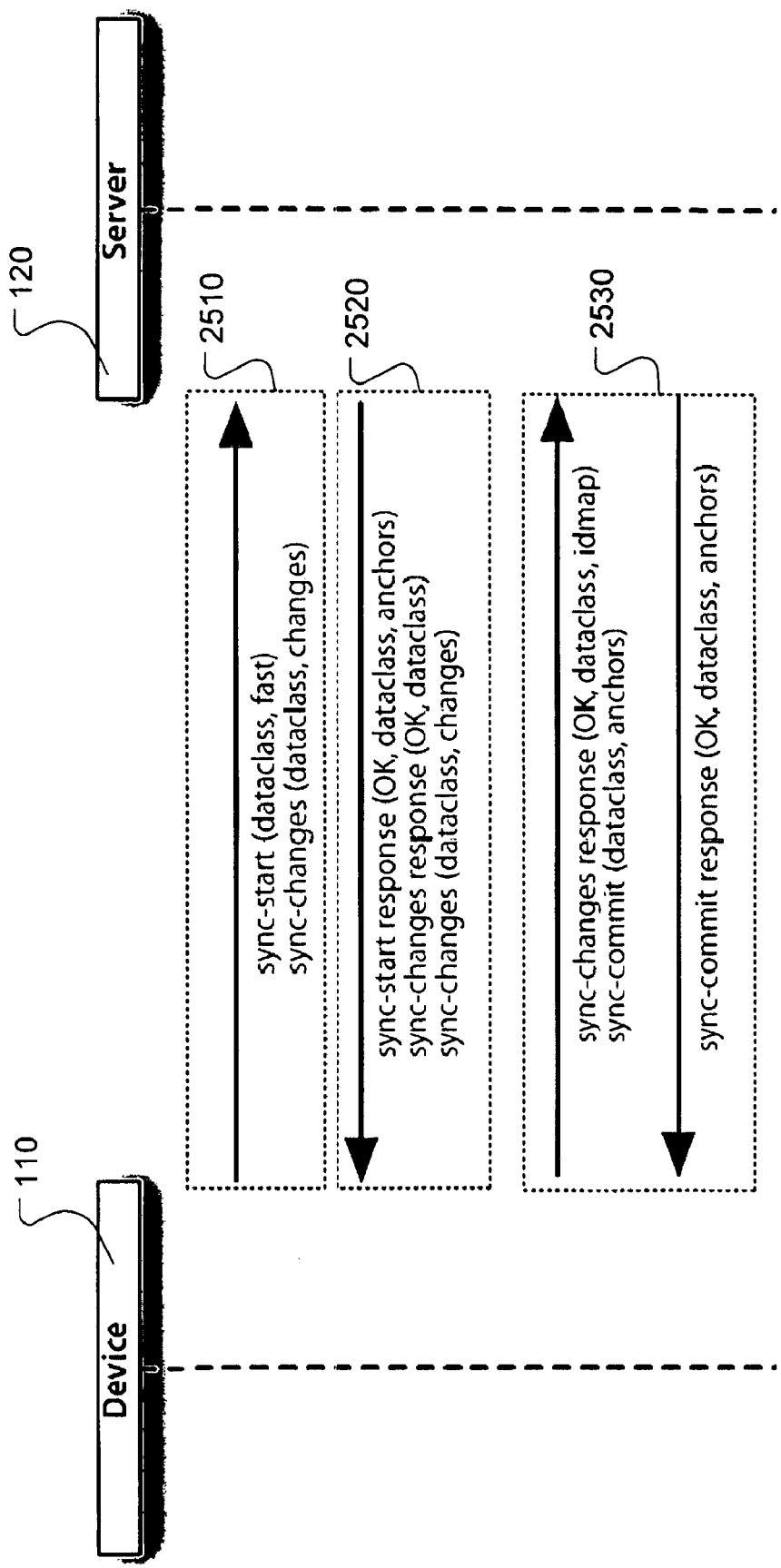
FIG. 25 shows an example of a optimal fast or reset sync between a client device and a server.

FIG. 25 shows an example of an optimal fast or reset data sync between the client device 110 and the server 120. Sync phase compression enables the client device 110 to compress distinct sync state machine phases. For example, when the client device 110 believes the likely sync mode will be "fast" or "reset", the client device 110 sends negotiation ("sync-start") and pull phase commands ("sync-changes") in the first message 2510 to the server 120. Sync phase compression can minimize or eliminate wasted network traffic in case the server 120 rejects the requested sync mode. In the example shown in FIG. 25, the client device 110 sends a first message 2510 that includes the "sync-start" and "sync-change" commands. However, the server 120 may not send a "sync-commit" command in the second message 2520. Instead, the server 120 sends a "sync-start" response, a "sync-changes" response, and a "sync-changes" command in the second message 2520. In the second round trip 2530, the client device 110 sends a sync-change response and a "sync-commit" command. The server 120 responds with a "sync-commit" response.

Figure 26:
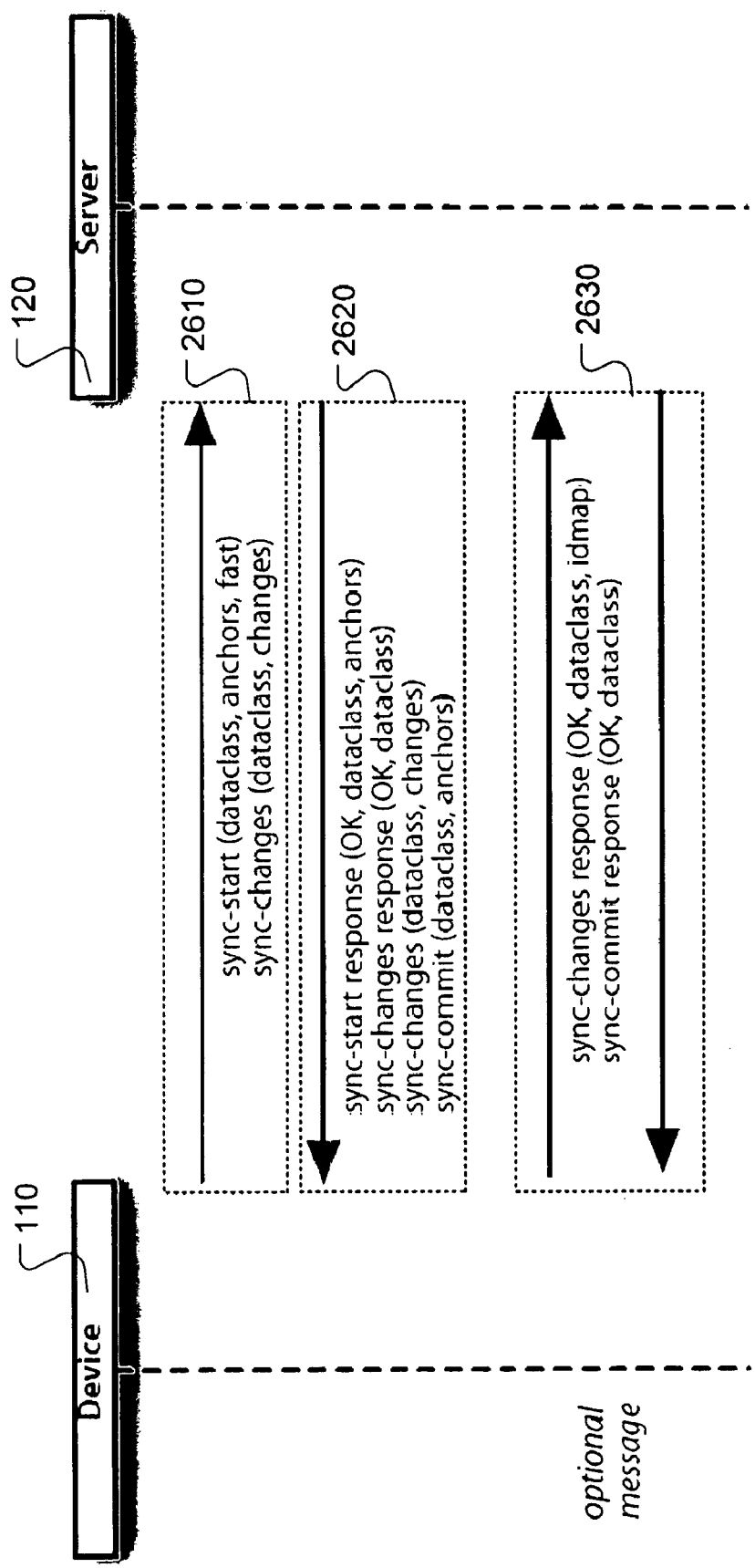
FIG. 26 shows an alternate example of a fast or reset data sync.

FIG. 26 shows another example of an optimal fast or reset sync between the client device 110 and the server 120. The client device 110 sends negotiation ("sync-start") and pull phase commands ("sync-changes") in the first message 2610 to the server 120. The sync-start negotiation command can include parameters that indicate the dataclass, the anchors and the sync mode. In the example shown in FIG. 26, the fast sync mode is indicated.

In the example shown in FIG. 26, the sync server 120 compresses the push and commit phases by sending its "sync-changes" and "sync-commit" commands for a given dataclass in the same message. In response to sync-start and sync-change commands, the server 120 replies with a sync-start command response (OK, dataclass, anchors) and sync-change command response (OK, dataclass) in the second message 120. In addition, the server 120 can include a sync-changes command (dataclass, changes) and a sync-commit command (dataclass anchors) in the second message 2620 to complete one round trip. Thus, the optimistic approach can complete data synchronization in a single HTTP roundtrip.

A data sync can be completed in two roundtrips when the client device 110 responds to the server's 120 "sync-changes" command in the second message 2620 with an optional message for id mapping in the second round trip 2630. The client device 110 can also send a sync-commit response in the optional message.

Figure 27:
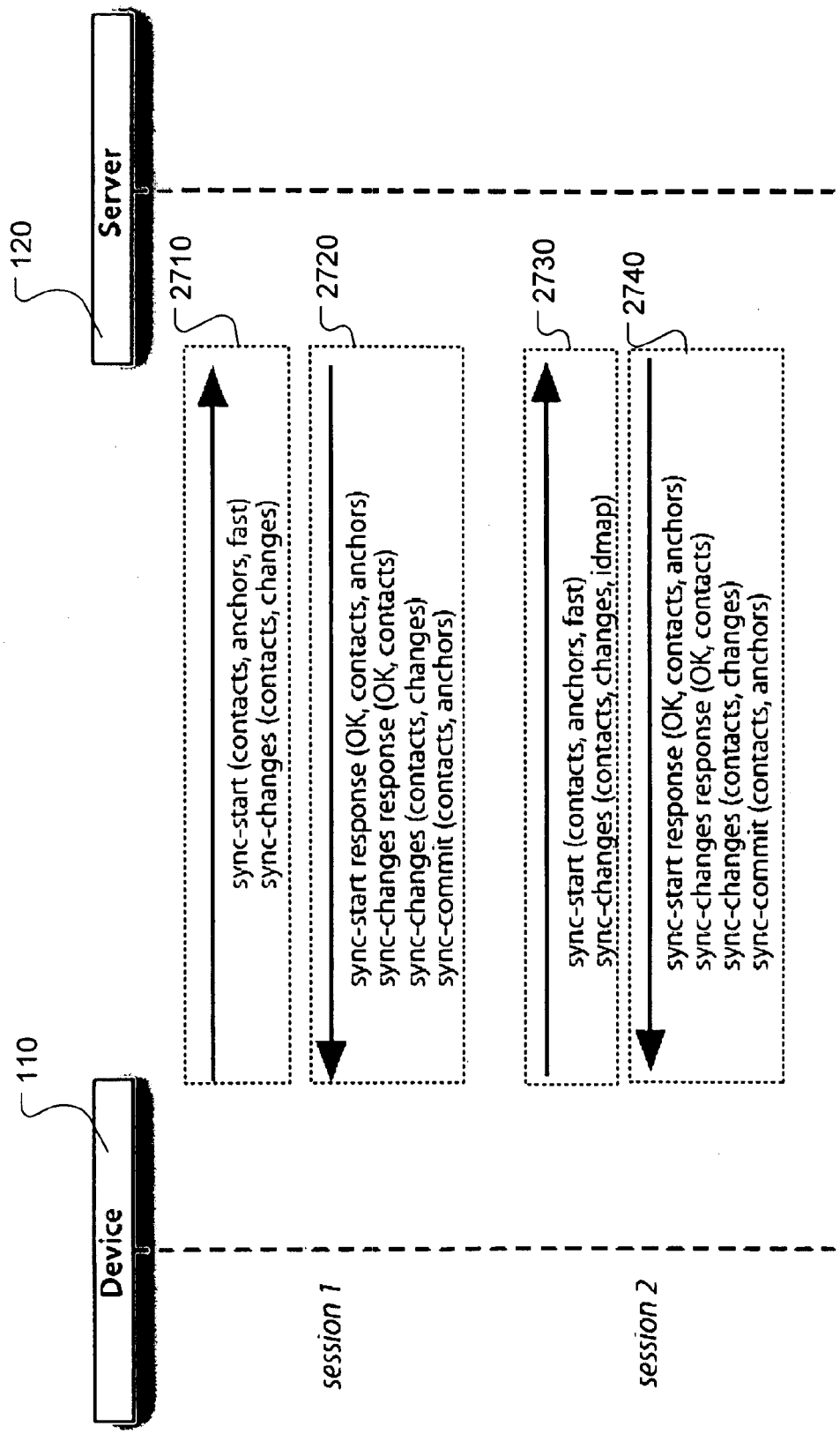
FIG. 27 shows another example data sync session with idmap deferred from session 1 to start of session 2.

In some implementations, the client device 110 may defer sending id mappings to the server 120 until a subsequent session and may omit sending the sync-commit response, since the server 120 can infer that the commands were received and processed by comparing the sync anchors sent in the subsequent session. FIG. 27 shows an example data synchronization between a client and a server, where the device omits sending the command response to "sync-changes" or "sync-commit" when the server's previous message was final. In that case, any pending id mappings (if necessary) is sent to the server 120 in the subsequent sync session.

In the first message 2710, the client device 110 compresses the negotiation and pull phases as described with respect to FIG. 25. In response, the server 120 sends a second message 2720 with the push and commit phases compressed as described with respect to FIG. 26. The first session is completed in one round trip.

A second sync session is initiated by the client device 110 with the pull and negotiation phases compressed in the third message 2730. In addition, the pending id mappings leftover from the first session is sent to the server 120. The server 120 responds in the fourth message 2740 with sync-changes and sync-commit commands.

FIG. 28 illustrates an example of a slow sync. When the client device 110 believes the next sync mode will be "slow" sync mode, the client device 110 does not compress the negotiate and pull phase because sending it's entire data set in the initial request message 2810 to the server 120 can be expensive with respect to processing cost, for example. In addition, when detecting that the server 120 has negotiated to a "reset" sync mode, sending the data would have been wasted bandwidth.

In this slow sync mode, the client device 110 sends a sync-start command with the dataclass, anchors and the slow sync mode identified in the first message 2810. The server 120 responds in the second message 2820 with a sync-start response. In the third message 2830 (second round trip), the client device 110 sends a sync-changes command for a dataclass. The server 120 responds in the next message 2840 by including a sync-changes response (OK, dataclass), sync-changes command (dataclass) and sync-commit command (dataclass, anchors). In the third round trip 2850, the client device 110 sends a sync-changes response (OK, dataclass, idmap) and a sync-commit response (OK).

Figure 29:
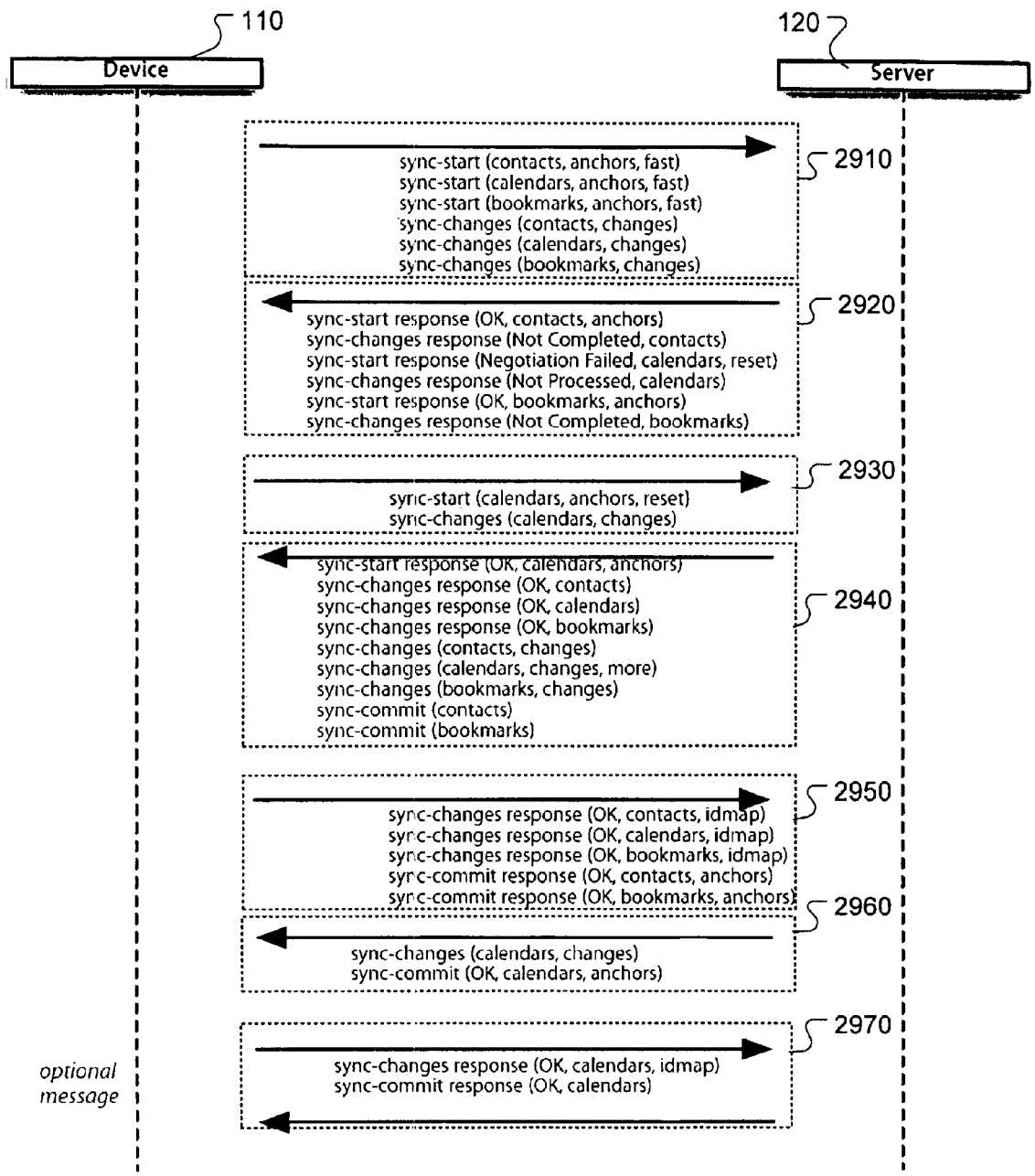
FIG. 29 shows an example of syncing multiple data classes in parallel.

FIG. 29 shows an example of syncing multiple data classes in parallel. Implementing multiple dataclass state machines in parallel ("parallelism") enables multiple dataclasses to sync in parallel. Each dataclass, as specified by the "uri" required parameter in all "sync" family commands, operates its own distinct state machine. Thus, in the optimal case, all dataclasses can fast sync in a single transport roundtrip. In comparison, other synchronization protocols such as Open Mobile Alliance-Data Synchronization protocol (formerly known as the SyncML protocol) OMA DS/SyncML sync in series and can require 5 or more roundtrips per dataclass.

In the example shown in FIG. 29, multiple dataclasses, such as contacts, calendars and bookmarks are synced in parallel. In the first message 2810, the client device 110 sends sync-start commands for these dataclasses in parallel. In the same message 2910, the client device 110 also sends sync-changes command for the multiple dataclasses. The server 120 sends a response 2920 with sync-start responses and sync-changes responses for the multiple dataclasses. For example, the sync-start response from the server 120 states that the calendars dataclass is reset on the server 120 due to a failed negotiation. In addition, the sync-changes response for the calendars states that the changes have not been processed for the calendars dataclass. The sync-start commands for contacts and bookmarks are successful as shown by the OK status of the sync-start response. The sync-changes commands for contacts and bookmarks have not completed, as shown by the S_NotCompleted status of the sync-changes responses.

In the next message 2930, the client device 110 sends another sync-start command requesting a reset sync (the sync mode requested by the server in the previous calendars sync-start command response) and sync-changes command for the calendar dataclass with an empty items parameter. The server 120 responds in the next message 2940 with a sync-start response and a sync-changes response for the contacts, calendars and bookmarks dataclasses; a sync-changes response for the contacts and bookmarks; sync changes command for calendars indicating that more changes are pending; and sync-commit command for contacts and bookmarks. These two message 2930 and 2940 make up the second round trip.

The third round trip begins with a message 2950 from the client device with sync-changes response for contacts, calendars and bookmarks. The message 2950 includes sync-commit responses for the contacts and bookmarks. To complete the third round trip, the server 120 sends a sync-changes command for dataclasses and sync-commit commands to the client device 110 in the next message 2960. Thus, in just three transport protocol roundtrips, multiple dataclasses syncing, sync mode renegotiation (calendars were reset on the server), and split sync-changes (calendar changes from the server were sent in message 2940 and message 2960) can be completed.

An optional fourth roundtrip 2970 can be implemented to enable the client device 110 to send a sync-changes response for the calendars with idmap and a sync-commit response to the server 120.

The server 120 does not perform the mingle phase until all dataclasses have completed the pull phase (i.e. upon receipt of the third message). This enables the server 120 to perform all work in a single sync job. The server sends S_NotCompleted for the dataclasses other dataclasses until all the client 110 changes for all dataclasses has been received by the server 120.

Sync Anchor Checkpoints

The synchronization protocol uses the "sync anchors" parameter in the commands and command responses to organize and maintain trackable sync sessions. The server 120 can manage the anchors in the commands and the command responses vis-à-vis its internal versioning methods.

Sync anchors are opaque data that the client device 110 and the server 120 exchange during the sync process. The anchors can be exchanged during the negotiation phase to determine the sync session's sync mode. Then, during the commit phase, a new set of anchors can be exchanged and persisted for use during the following sync sessions. By comparison, other sync protocols use the anchors at the beginning of the sync session, and the anchors are updated only when the sync session completes successfully, or are rolled back if the session is cancelled or terminates unexpectedly.

Any discrepancy between expected and actual anchors during negotiation (known as anchor mismatch) can result in a slow sync, or at the very least, retransmission of all data from the failed sync session. On an unreliable data-network, this can lead to a situation where no progress can be made and synchronization with the server is effectively blocked from successfully completing a sync until external conditions change. Unexpected session failures can also lead to anchor mismatches on the next sync session.

The OTA synchronization protocol 140 enables the server 120 to optionally return updated anchors at various checkpoints during a sync session. The "anchor" parameter may be present in any sync family command or command response. A checkpoint anchor contains the "next_server anchor" element and may contain the "mode" element. This enables fine-grained updating of sync anchors to reduce the likelihood and impact of anchor mismatches. Each server anchor is encoded with information that provides the server 120 with precise information regarding the internal server state at the time the anchor was generated. For example, the server anchor can be encoded with information on whether the changes requested from the client device 110 have been mingled with the central database. The server anchor can also be encoded with information on which updates have been accepted by the client device 110. Further, the server anchor can be encoded with information on whether the sync session was completed normally. Other internal server states can be encoded in the server anchor.

Example anchor checkpoints can include the "end of server mingle phase" in response to the client device's final "sync-changes" command. The anchor checkpoints can also include the point during a split "sync-changes" and the commit phase among others.

The server 120 can intelligently decide the time and location to add the checkpoint anchors. When the checkpoint anchors are placed in a "sync-changes" command, the checkpoint anchors guarantee that the received data set enforces the data integrity requirements of the dataclass's schema. For example, the data integrity requirements can include having no references to unknown entities in a check pointed data set.

After the pull phase is complete, the most recent checkpoint anchors may be saved by the client device 110, even if the sync session is cancelled.

The sync server 120 will expire the checkpoint anchors when they are no longer needed, or when the server needs to release associated server-side resources used to maintain the checkpoint state. When the client device 110 supplies an unknown or expired checkpoint anchor, the sync session will still fall into slow sync mode.

During the next sync session's negotiation phase, the "sync-start" command, the client device 110 sends its last saved anchors to the server 120. The server 120 uses the information encoded in these anchors to start a sync session from the most recent saved checkpoint, even if the previous sync session terminated unexpectedly or a "sync-commit" command response was not explicitly returned to the server 120. When the client device 110 receives such anchors during a sync session, the client device 110 retains the most recent anchor from the server, and save its value to send in the "sync-start" command for the next sync session.

Figure 30:
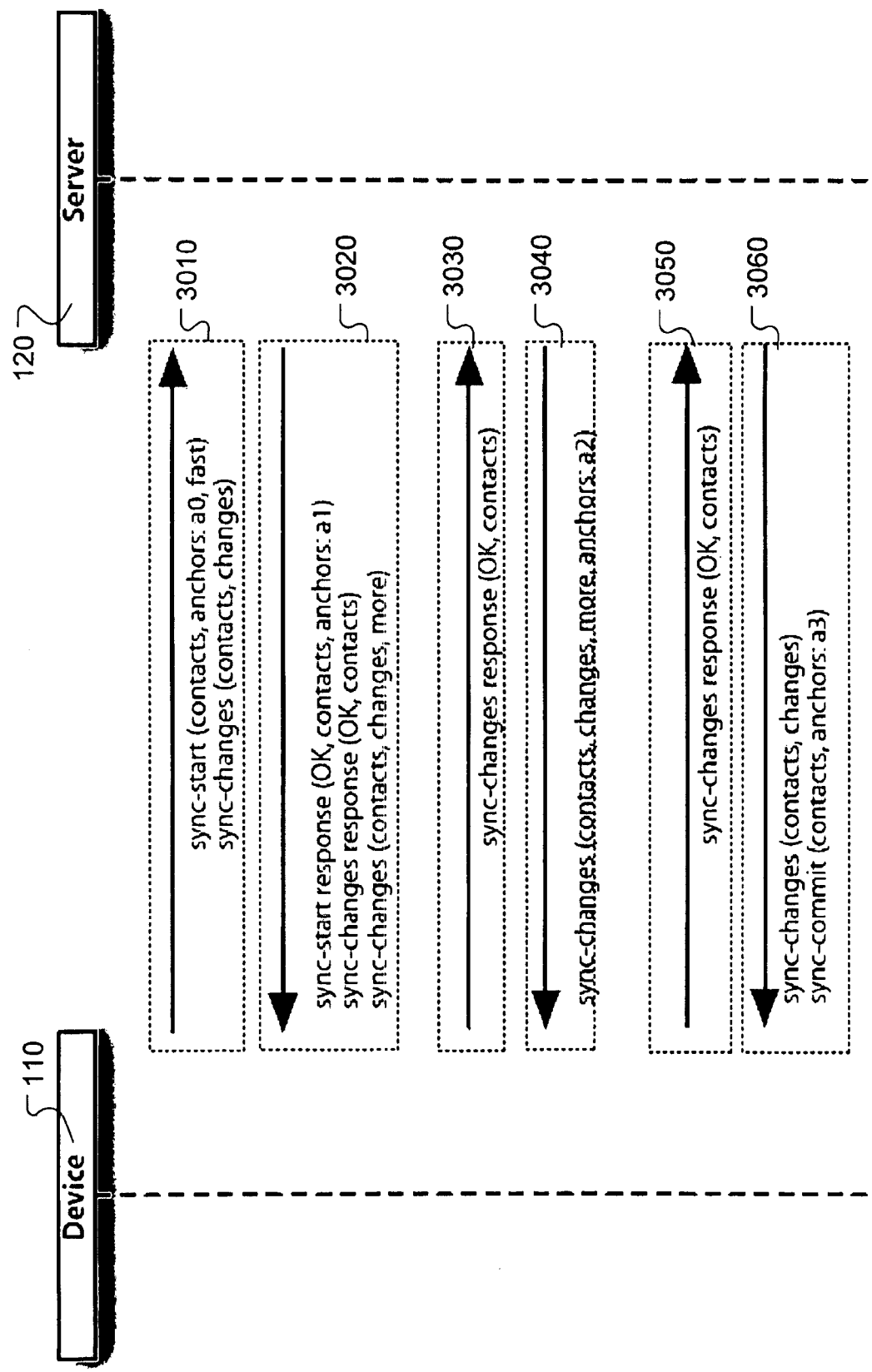
FIG. 30 shows an example sync session that uses checkpoint anchors.

FIG. 30 shows an example sync session that uses checkpoint anchors. The client device 110 initiates a sync session by sending a message 3010. The client device 110 uses an anchor, a0, in the message 3010. This anchor, a0 can be the last server anchor value from the previous sync session. The client device 110 and the sync server 120 exchange other messages 3020, 3030, 3040, 3050 and 3060 as needed. At various points during the sync session, the sync server 120 returns checkpoint anchors a1, a2, and a3 using these messages 3020, 3030, 3040, 3050 and 3060.

Upon receiving and processing each message containing an "anchors" element from the sync server 120, the client device 110 updates its anchor. When the sync session become interrupted or a message lost, the client device supplies the last anchor it successfully processed in the "sync-start" command of the next session. Depending on which anchor value is received, the sync server 110 can infer which actions must be taken to complete the previous sync as necessary. Thus, incremental synchronization progress can be made even on extremely fragile wireless networks or when large data sets need to be sent.

FIG. 31 is a table showing example checkpoint anchors. The table includes columns that describe the possible checkpoint anchors 3110, the associated sync phases 3120 and server state 3130 associated with the checkpoint anchors. For example, the anchor a0 can represent the negotiation phase, which cause no change in the sever state. The anchor a1 can represent the push phase. The server 120 applies the changes requested by the client device 110, and the server 120 sends part 1 of its changes to the client device 110. The anchor a2 can represent the push phase initiated by the server 110. The server sends part 2 of its changes to the client device 110. The anchor a3 can represent the commit phase and signal that committing the changes has been completed. This anchor signals that the synchronization session has been completed.

Device Settings

The synchronization protocol 120 provides a mechanism for the server 120 to dynamically request device settings and capabilities. The "get" and "put" commands may be used to exchange information. At anytime, the server 120 may send a "get" command with the "uri" parameter having the value "deviceinfo" to request device settings and capabilities, for example. Alternatively, the client device 110 may send a "put" command with the same "uri" parameter to the server 120. The value of the "uri" parameter is a dictionary containing various key-value pairs. When present, the value for "userid" represents the authenticating principle and is implemented as a String. When present, the value for "authtype" represents the authentication scheme and is implemented as a String. When present, the value for "auth" represents the authentication credential and is represented as a String. When the recipient is willing to perform the operation, the recipient returns a success status, such as status S_OK (600). When the requested URI is unknown, the recipient returns a status, such as the status E_NotFound (603) to indicate the URI was not found and is unknown. When the requested operation is not permitted, for example the authorized principle is not allowed to delete the URI, the recipient returns a status, such as the status E_NotAllowed (604) to indicate that the requested operation is not permitted. When the requested operation could not be performed because the supplied data was incorrect, the recipient returns a status, such as the status E_BadValue (607) to indicate that the requested operation could not be performed. When the requested operation could not be performed because the supplied "itemtype" was incorrect, the recipient returns a status, such as the status E_NotSupported (614) to indicate that the requested operation is not supported.

FIG. 32 shows a table of example key-value pairs for the "uri" parameter. The available keys 3210 for the "un" parameter includes version, msisdn, deviceid, name, model, carrier and dataclasses. The associated values 3220 for the version, msisdn, deviceid, name, model and carrier keys are string values. The value 3220 for the dataclasses key is a dictionary. The table also shows the associated description 3230 for these keys. For example, the version key-value can describe the product version, such as version 1.1.4. The msisdn key-value can describe the phone number of a currently installed SIM card. The deviceid key-value can describe the ICCID. The name key-value can describe the user's device name, such as EctoPhone. The model key-value can describe the model of the client device 110, such as iPhone®, iPod Touch®, etc. The carrier key-value can describe the carrier name, such as AT&T®, Verizon®, etc. The dataclasses key-value can describe When the client device 110 first syncs with the server 120, the server 120 requests for device information by sending a "get" command. Thereafter, when the device information changes, the client device 110 sends the changed device information to the server 120 by sending a "put" command.

Filtering

Filtering is the ability to constrain a set of data items synchronized with the client device 110 based on the values in the data items. For example, a user may want to sync only the contacts contained within a certain set of groups, or the calendar events within a certain time window surrounding the current date.

In a data sharing/managing application, such as iTunes® filter settings are enforced by the computer during cable syncing to constrain or filter the set of data items sent to the client device 110, such as iPhone®. The synchronization protocol 140 provides similar filtering functionality in a wireless sync solution. The same filter settings from iTunes® is enforced by the server 120 without requiring any user action. Thus, the filtering can be performed automatically. Alternatively, a user interface (UI) on the client device 110 can be presented to the user to enable the user to display and edit the filter settings to be enforced.

The synchronization protocol 140 enables the filter settings to be exchanged between the client device 110 and the server 120 using primitive commands. The filter information is specified using a "uri" parameter of the form "dataclass/<dataclassname>/filter". The value of the filter information is a dictionary.

FIG. 33 is a table showing example key-value pairs for filter settings. The available keys 3310 for the filter settings include default_container, constrain_containers, and discard_after_days. The values 3320 of these filter setting keys are string, array and string respectively. The dataclass 120 of the default_container key includes contacts and calendars. Also, the dataclass 120 of the constrain_containers key includes contacts and calendars. The dataclass 120 of the discard_after_days key includes calendar.

The default_container key describes the identification (LUID) of the container entity, such as the group ID for contacts and calendar ID for events. The constrain_containers key describes the set of LUIDs of container entities to include, such as the set of Groups to include. The discard_after_days key describes the number of days after which events older than the described number of days should be deleted.

FIG. 34 is an example of a diagram in pseudo Backus-Naur Form (BNF). The pseudo Backus-Naur Form is a handy way of describing syntax. BNF is a metasyntax that enables expression of context-free grammars. Context-free grammars can define the syntax of a programming language by using two sets of rules: Lexical rules and Syntactic rules. Augmented BNF is a modified version of BNF that uses different naming rules, repetition, alternative, order-independence, and value ranges.

Figure 35:
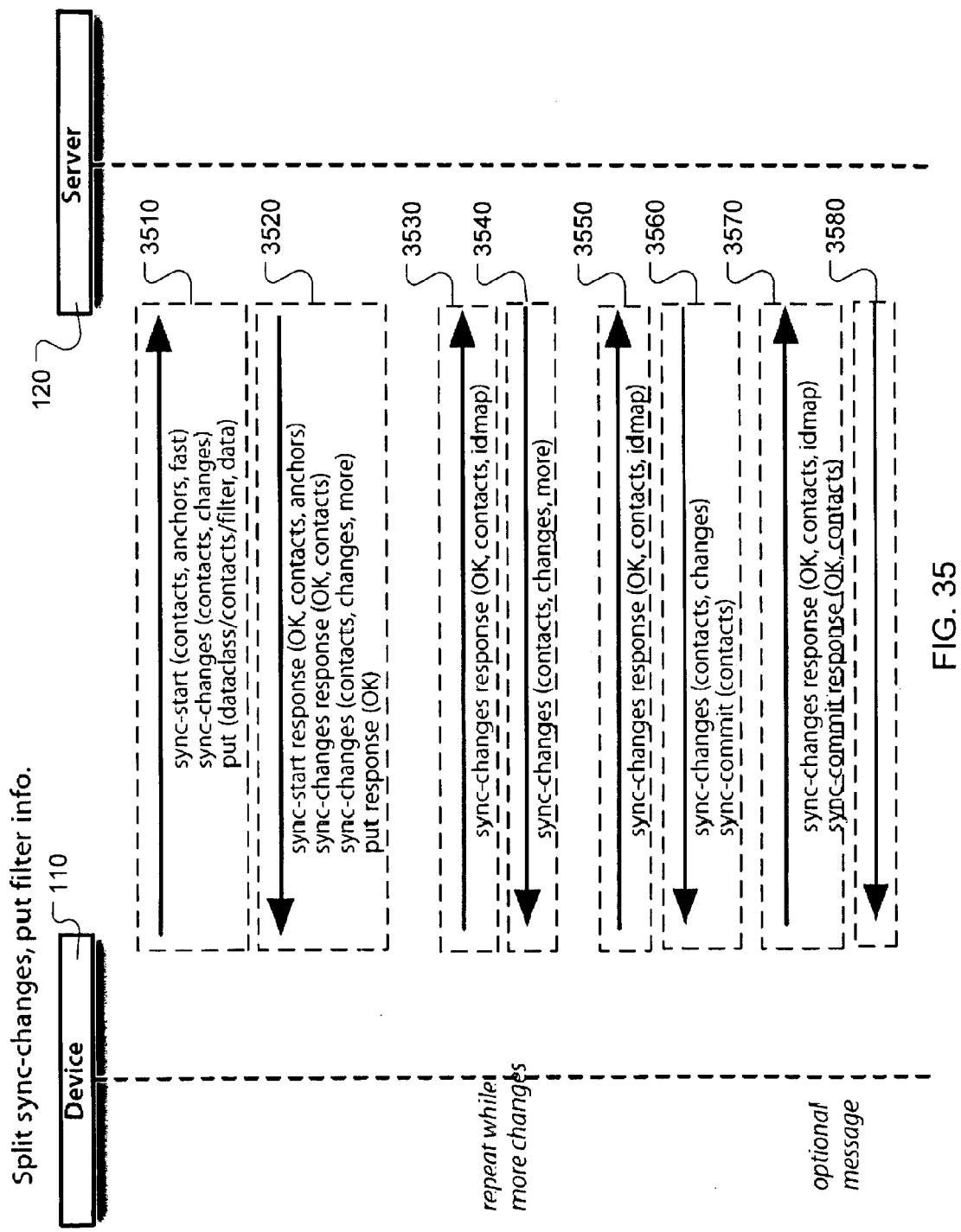
FIG. 35 shows an example sync session.

FIG. 35 shows an example sync session. The example sync session shown in FIG. 35 includes split sync-changes and put filter information. The client device 110 sends a negotiation phase command ("sync-start") and a pull phase command ("sync-changes") in the first message 3510 to the server 120. The put command is used to send data items for a specific dataclass. In the example shown in FIG. 35, the dataclass indicated in the put command is contacts. Also, the data items are filtered to constrain the data to be synced for the dataclass.

In the second message 3520, the server 120 responds by sending a sync-start command response with the status "S_OK" to indicate a successful negotiation for the contacts dataclass. In addition, anchors are used to indicate the checkpoint. Also, the server 120 sends a sync-changes command for the contacts dataclass with the "more" Boolean flag indicate that not all appropriate data items for the dataclass are included in the command params. Further, the second message 3520 can be include a put command response with a "S_OK" status indicating a successful put.

In the third message 3530, the client device 110 includes a sync-changes command response with the "S_OK" status for the contacts dataclass indicated by the uri parameter. Also, idmap is included to provide GUID-LUID mapping, for example. In the fourth message 3540, the server 120 sends a sync changes command with the uri parameter indicating the contacts dataclass. Also, the "more" Boolean is included to indicate that more data will follow. In the fifth message 3550, the client device 110 sends a sync-changes command response with a status "S_OK" to indicate a successful update for the contacts dataclass. In the sixth message 3560, the server 120 sends a sync-changes command and a sync-commit command for the contacts dataclass. The client device 110 responds in the seventh message 3570 with a sync-changes command response indicating a successful update. The client device 110 also includes a sync-commit response (OK) to indicate the client device has committed the changes. The last message 3580 has an empty message body to indicate a sync session's final message.

Figure 37B:
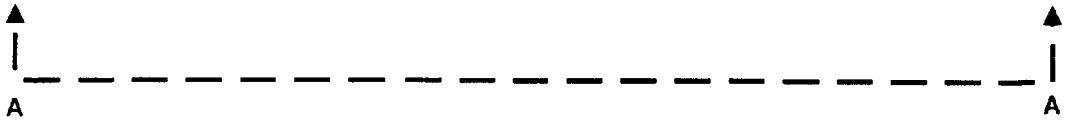
Figure 38D:
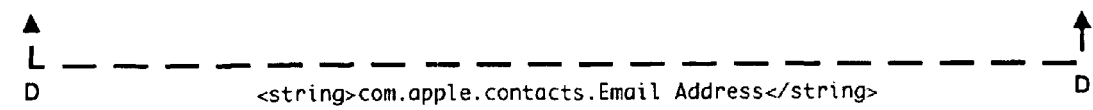

FIGS. 36, 37a, 37b, 38a, 38b, 38c, 38d, 39a, 39b, 39c, 40a and 40b represent wiretrace examples for a sync session. FIG. 36 shows a summary of four example messages for a reset sync session. FIGS. 37a and 37b show an example message sent from the client device 110 to the server 120. The sync-start command includes the uri parameter with the value "com.apple.Contacts" indicate the dataclass. Also, the sync mode is indicated as "reset." The message also includes a sync-changes command with the same dataclass (com.apple.Contacts), and empty changes.

FIGS. 38a, 38b, 38c and 38d show an example message sent from the server 120 to the client device 110. The server 120 sends a sync-start command response with the status "S_OK" to indicate a successful negotiation. The message also includes a sync-changes command response with the status "S_OK" to indicate a successful data update. In addition, the server 120 sends a sync-changes command that sends one contact, phone number and email address. The server 120 also sends a get command to pull device information from the client device 110.

Figure 39C:

FIGS. 39a, 39b and 39c show an example message sent from the client device 110. The message includes a sync-changes command response with the status "S_OK" to indicate a successful update of the data items changed. The idmap parameter is provided to indicate the GUID to LUID mapping. The message also includes a get command response with the status "S_OK" to indicate a successful get operation in returning the device information. Further, the message includes a sync-commit command to indicate that the client device 110 has committed and the server 120 should commit also.

Figure 42B:
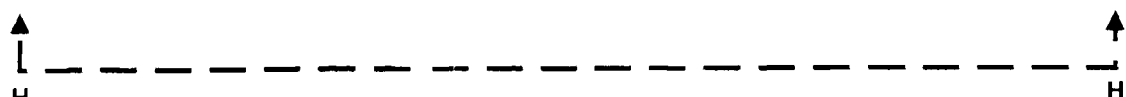

FIGS. 40a and 40b shown an example message sent from the server 120. The server 120 sends a sync-commit command response with the status "S_OK" to indicate the server 120 had committed the changes also FIGS. 41, 42a, 42b, 43a, 43b and 43c show example messages for a fast sync. The client device 110 and the server 120 each have one delete. FIG. 41 shows a summary of the two example messages for a fast sync. FIGS. 42a and 42b show an example message sent from the client device 110 for a fast sync. The message includes a sync-start command for the negotiation phase. The uri parameter indicates the dataclass as com.apple.Contacts. The sync mode is indicated as fast. The message also includes a sync-changes command to delete a data record for the indicated corn.apple.Contacts dataclass.

Figure 43B:
Figure 43C:
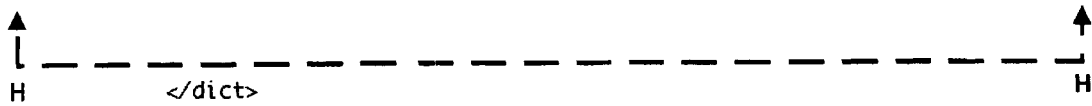

FIGS. 43a, 43b and 43c show an example message sent from the server 120 in response to the message sent by the client device 110. The message includes a sync-start command response with the status "S_OK" to indicate a successful negotiation. The message also includes a sync-changes command response with the status "S_OK" to indicate a successful delete of the data record indicated by the client device 110. In addition, the server 120 sends a sync-changes command to request another data record delete. The same dataclass, com.apple.Contacts is indicated by the uri parameter in the sync-changes command. Thus, another data record from the com.apple.Contacts is requested to be deleted, this time by the server 120. The message from the server 120 also includes a sync-commit command to indicate that the server 120 has committed the sync and that the client device 110 should also commit.

Figure 44A:
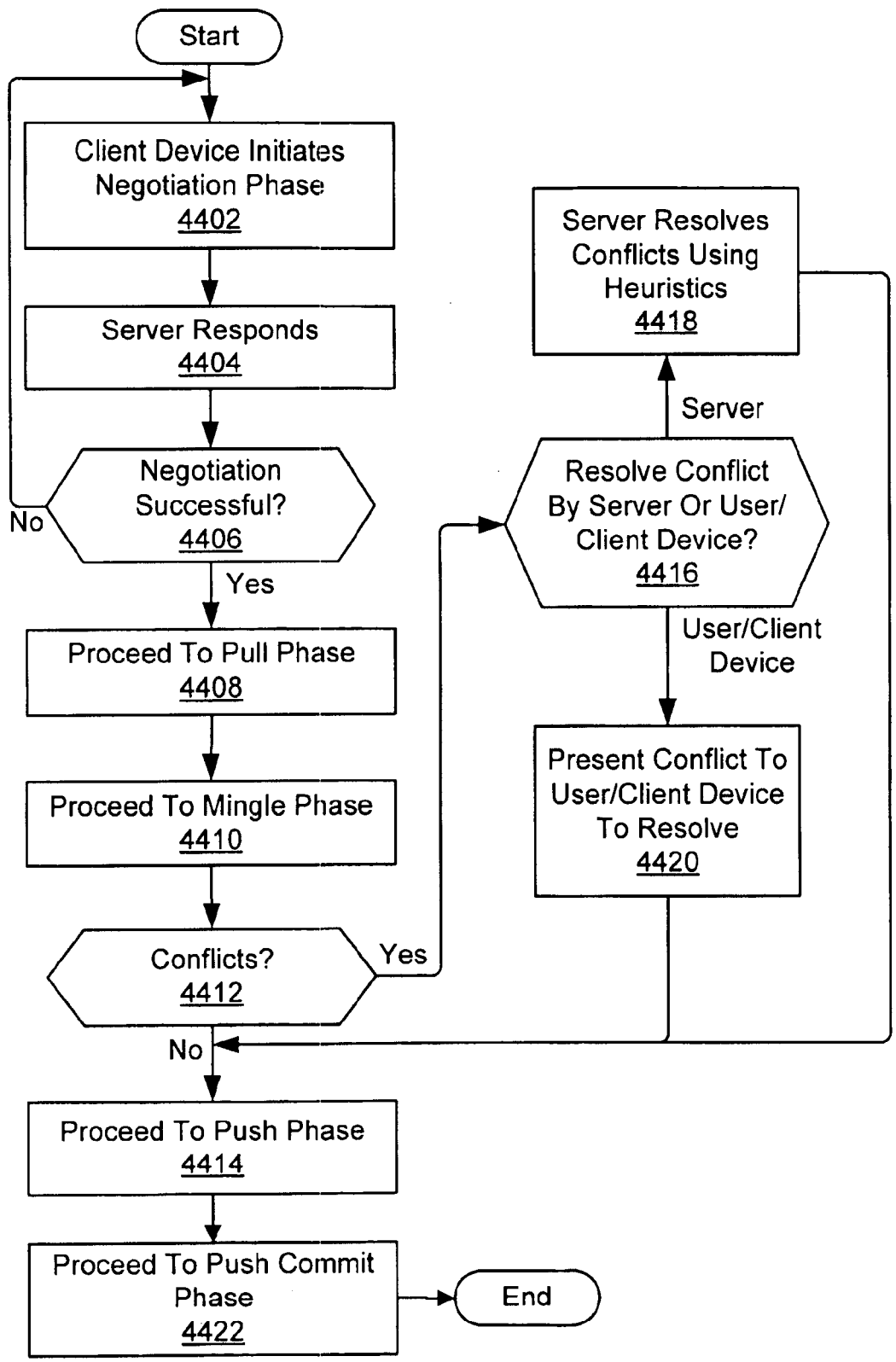
FIGS. 44a and 44b show an example process for syncing a client device and a server.
Figure 44B:
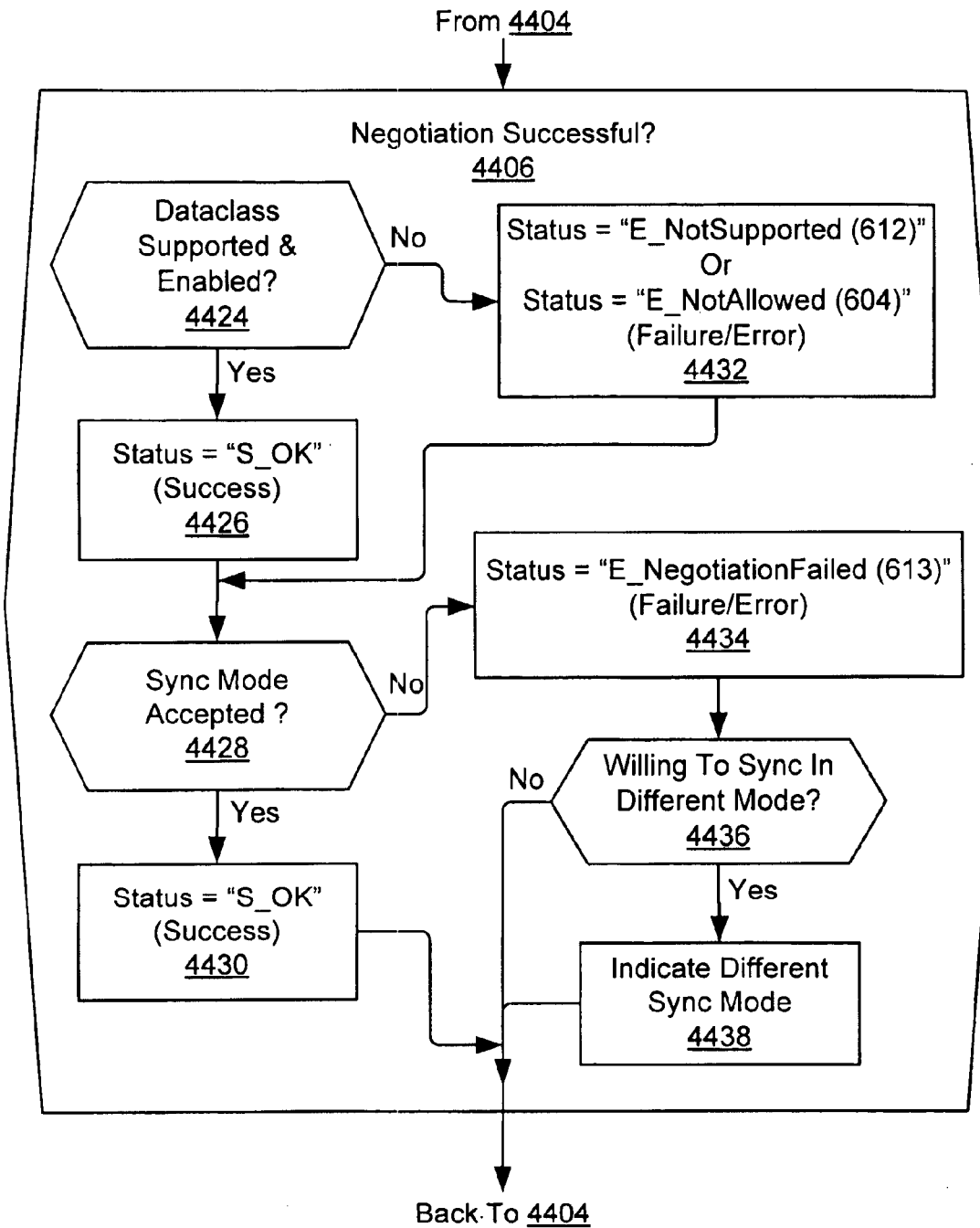

FIGS. 44a and 44b show an example process for syncing a client device 110 and a server 120. The sender initiates 4402 a negotiation phase with the recipient. In this example, the sender is the client device 110 and the recipient is the server 120. The negotiation phase is initiated 4402 by sending a message with a stateful sync-family command, such as sync-start. The sync-start command includes a uri parameter that indicates a particular dataclass and an anchors parameter that can include the requested sync mode, datastore versions and/ or sync anchors. When syncing multiple dataclasses in parallel, a separate "sync-start" command request is sent for each dataclass. These parallel sync-start commands included in the same message to enable the server to process them within the same sync job.

The server 120 responds 4404 to the negotiation phase by sending a message to the client device 110 with a sync-start command response. A determination 4406 is made on whether the negotiation is a success. The dataclass indicated by the uri parameter is detected and analyzed to determine whether the server 120 supports and enables 4424 the dataclass. When detected that the dataclass is not supported, an error status such as "E_NotSupported (612)" is generated 4432. The generated error status can be included in the sync-start command response to indicate that the dataclass is not supported. When detected that the server 120 does not enable the dataclass, an error status such as "E_NotAllowed (604)" is generated 4432. The generated status is included in the sync-start command response to indicate that the dataclass is not enabled. When detected that the dataclass is supported and enabled, a success status such as "S_OK" is generated 4426. The generated status is included in the sync-start command response to indicate that the server 120 supports and enables the dataclass.

When the anchors parameter of the sync-start command includes a requested sync mode, the requested sync mode is analyzed to determine whether the server 120 accepts 4428 the sync mode. When the sync mode is not accepted by the server 120, an error status such as "E_NegotiationFailed (613)" is generated 4434. The generated status is included in the sync-start command response to indicate that the requested sync mode is not accepted. The server 120 may decide 4436 whether to suggest a different sync mode to use. When the server 120 is willing to sync in a different mode, the suggested different mode is included 4438 in the anchors parameter in the sync-start command response.

When the requested sync mode is accepted, a success status such as "S_OK" is generated 4430. The generated success status is included in the sync-start command response.

When detected that the negotiation is successful, as indicated by the "S_OK" status, the sync session proceeds 4408 to a pull phase. When the sync mode is fast, the client device 110 sends the changed records to the server 120. When the sync mode is "slow", all records are sent to the server 120. The changes are sent using the sync-changes stateful commands. The server 120 responds to the sync-changes command with the corresponding sync-changes command response to indicate whether the changes have been accepted. The success status "S_OK" indicates that the changes have been accepted.

When all changes have been received, the server 120 proceeds 4410 to the mingle phase. When syncing multiple dataclasses in a single session, the sync-changes commands for each dataclass will have distinct state machines. However, the server 120 waits until all dataclasses have completed the pull phase or cancelled before proceeding to the mingling phase. Any detected invalid changes may be rejected by the server 120.

During the mingle phase, the server decides 4412 whether any conflicts exists for the dataclass. When detected that conflicts exist, the server 120 decides 4416 whether to resolve the conflicts itself or whether to let the user or client device 110 resolve the conflicts. When the server 120 resolves the conflicts, the server 120 can rely on heuristics to resolve the conflicts. For example, the client device 110 initiating the most recent sync may be selected as the winner.

For some instances such as the dataclass and/or data item, the user/client device 110 may be selected as the one to resolve the conflicts. Then the detected conflicts are sent to the client device 110 to enable the client device 110 to resolve the conflicts. Also, the detected conflicts can be presented to the user by displaying the conflicts on a display unit on the client device 110, for example. The user can resolve the conflict manually. The result of the conflict resolution may then be sent from the device 110 to the server 120 during the next sync session.

The changes from the server 120 (recipient) can be sent to the client device 110 during the push phase 4414. The server 120 can send a message to the client device with sync-changes commands to push the changes to the client device 110.

Finally, once all updates have been received, the commit phase is entered 4416. Both sides agree that the sync was successful, persist their current sync anchors, and commit the exchanged data to their respective data stores. In the commit phase, messages are sent with sync-commit commands and command responses.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method of synchronizing data, the method comprising:
    receiving, at a server, a single message requesting to sync data associated with multiple dataclasses with at least one client device, wherein the message includes a proposed sync mode for each of the multiple dataclasses;
    negotiating, at the server, the proposed sync mode for each of the multiple dataclasses in parallel responsive to receiving the message;
    sending, from the server, a reply message that includes one or more status codes indicative of whether the proposed sync mode for each dataclass has been accepted by the server.

2. The method of claim 1, comprising:
    based on the one or more status codes, using an accepted sync mode negotiated for each dataclass to selectively update the data associated with the multiple dataclasses.

3. The method of claim 2, wherein the accepted sync mode uses field level differencing.

4. The method of claim 2, wherein the accepted sync mode uses record level differencing.

5. The method of claim 1, further comprising:
    rejecting the proposed sync mode for at least one of the multiple dataclasses; and
    responding to the message with a different sync mode to replace the rejected proposed sync mode.

6. The method of claim 1, wherein the single message requesting to sync data is represented as a binary property list file (plist).

7. The method of claim 1, wherein the reply message is represented as a plist.

8. A method of synchronizing data in one round trip comprising two messages, the method comprising:
    initiating, at a server, a sync session to sync data associated with multiple dataclasses with at least one client device responsive to a first message from the at least one client device, wherein the message includes a proposed sync mode for each of the multiple dataclasses; and sending from the server, a second message to the at least one client device to complete the sync session, the second message comprising a status code to indicate acceptance or rejection of each proposed sync mode.

9. The method of claim 6, further comprising:

based on the status code, syncing the data using an accepted proposed sync mode or a replacement sync mode for each dataclass.

10. The method of claim 6, further comprising:

negotiating, at the server, the proposed sync mode for each of the multiple dataclasses in parallel responsive to receiving the first message.

11. A method of syncing data, the method comprising:

initiating, at a server, a sync session to sync data associated with multiple dataclasses with at least one client device responsive to a message from the at least one client device, wherein the message includes a proposed sync mode for each of the multiple dataclasses;

negotiating, at the server, the proposed sync mode for each of the multiple dataclasses in parallel responsive to receiving the first message;

generating, at the server, a status code indicating whether the proposed sync mode for each of the multiple dataclasses is accepted or rejected;

initiating syncing of the data using an accepted sync mode or a replacement sync mode assigned for each of the multiple dataclasses;

detecting, at the server, an interruption in a network connection between the server and the at lest one client device that interrupts the sync session; and resuming the sync session using the accepted sync mode or the replacement sync mode previously assigned to each of the multiple dataclasses before the network interruption.

12. The method of claim 11, further comprising:

sending a reply message to the at least one client device, the reply message including the generated status code.

13. The method of claim 1, wherein the message from the at least one client device comprises a header and a body, wherein the body comprises a sequence of command elements.

14. The method of claim 13, wherein the reply message comprises a header and a body, wherein the body comprises a sequence of command response elements.

15. The method of claim 14, further comprising:

assigning a unique label to each of the message, the reply message, command elements and command response elements to ensure proper ordering and loss detection.

16. The method of claim 13, comprising:

setting a flag in the header of the message or the reply message, wherein the flag indicates that the sync session is complete.

17. The method of claim 13, wherein the heard of the message or the reply message or both comprises a version number.

18. The method of claim 11, comprising:

assigning an anchor that keeps track of a state of the sync session.

19. The method of claim 18, wherein resuming the sync session comprises:

using the assigned anchor to identify the state of the sync session before the interruption.

20. The method of claim 11, comprising:

identifying a conflict associated with the data to be synced; and resolving the identified conflict.

\* \* \* \* \*